United States Patent
Srnec et al.

(10) Patent No.: US 11,623,499 B2
(45) Date of Patent: Apr. 11, 2023

(54) ELECTRICAL POWER SUPPLY MANAGEMENT FOR CLIMATE-CONTROLLED SYSTEM ASSOCIATED WITH AUTOMOTIVE APPLICATION

(71) Applicant: THERMO KING LLC, Minneapolis, MN (US)

(72) Inventors: Matthew Srnec, Minnetonka, MN (US); Michael James Vanous, Minneapolis, MN (US); Ryan Wayne Schumacher, Bloomington, MN (US); Carolyn Lewelling, Minneapolis, MN (US)

(73) Assignee: THERMO KING LLC, Minneapolis, MN (US)

( * ) Notice: Subject to any disclaimer, the term of this patent is extended or adjusted under 35 U.S.C. 154(b) by 490 days.

(21) Appl. No.: 16/678,629

(22) Filed: Nov. 8, 2019

(65) Prior Publication Data

US 2021/0138874 A1  May 13, 2021

(51) Int. Cl.
*B60H 1/00* (2006.01)
*B60H 1/32* (2006.01)
(Continued)

(52) U.S. Cl.
CPC ..... *B60H 1/00978* (2013.01); *B60H 1/00428* (2013.01); *B60H 1/3208* (2013.01);
(Continued)

(58) Field of Classification Search
CPC .............. B60H 1/3232; B60H 1/00978; B60H 1/00428; B60H 1/3208
See application file for complete search history.

(56) References Cited

U.S. PATENT DOCUMENTS 6,223,546 B1    5/2001  Chopko et al.
6,487,869 B1 *  12/2002  Sulc ...................... F04B 49/065
                                                   62/228.4
(Continued)

FOREIGN PATENT DOCUMENTS

DE    102015112357 A1 *  2/2017  ......... B60H 1/00014
EP    2679418              1/2014
(Continued)

OTHER PUBLICATIONS

Extended European Search Report, issued in the corresponding European patent application No. 20206328.5, dated Apr. 6, 2021, 8 pages.

*Primary Examiner* — Nelson J Nieves
(74) *Attorney, Agent, or Firm* — Hamre, Schumann, Mueller & Larson, P.C.

(57) ABSTRACT

Technologies described herein pertain to delivering power to primary and accessory electrical components associated with a vehicle that is at least partially electrically powered, as well as to a power source of the vehicle itself. To operate one or more of accessory electrical components and deliver power to a vehicle battery, via a power distribution unit, the embodiments facilitate understanding of dynamic power available to the accessory electrical components as well as the vehicle battery, and distributing of the power in a prioritized manner to optimize the system for a most efficient power delivery process, with regards to power needs and power availability. Managing power supplied to a climate control unit that is used in a transport climate control system providing climate control to at least one of an internal space of a vehicle, may be performed by a controller that is electrically connected to at least the climate control unit.

20 Claims, 12 Drawing Sheets

(51) Int. Cl.
   *B60P 3/20*   (2006.01)
   *B60R 16/03*   (2006.01)

(52) U.S. Cl.
   CPC .............. *B60H 1/3232* (2013.01); *B60P 3/20* (2013.01); *B60R 16/03* (2013.01)

(56) References Cited

U.S. PATENT DOCUMENTS

| | | |
|---|---|---|
| 3,000,858 A1 | 8/2011 | Tonegawa et al. |
| 8,295,950 B1 * | 10/2012 | Wordsworth ........... B60L 1/003 700/297 |
| 9,024,579 B2 | 5/2015 | Igata |
| 9,024,586 B2 | 5/2015 | Vance et al. |
| 9,352,635 B1 * | 5/2016 | Schepmann ....... B60H 1/00392 |
| 9,627,902 B2 | 4/2017 | Kamishima |
| 10,107,536 B2 | 10/2018 | Senf, Jr. et al. |
| 10,112,487 B1 | 10/2018 | Lee et al. |
| 10,317,119 B2 | 6/2019 | Zou |
| 10,369,896 B2 | 8/2019 | Namuduri et al. |
| 11,230,165 B2 * | 1/2022 | Cho .................. B60H 1/00792 |
| 2005/0001431 A1 | 1/2005 | Sauer et al. |
| 2006/0053814 A1 | 3/2006 | Naik et al. |
| 2007/0212598 A1 | 9/2007 | Iida et al. |
| 2008/0116830 A1 | 5/2008 | Gonzalez et al. |
| 2010/0271172 A1 | 10/2010 | Takikita |
| 2011/0213983 A1 | 9/2011 | Staugaitis et al. |
| 2012/0167605 A1 * | 7/2012 | Ikemiya ................ F25D 11/003 62/126 |
| 2014/0049216 A1 | 2/2014 | Nakagawa et al. |
| 2015/0183291 A1 * | 7/2015 | Higuchi ............. B60H 1/00849 62/133 |
| 2015/0231948 A1 * | 8/2015 | Kennedy .............. B60H 1/3232 62/243 |
| 2015/0298680 A1 | 10/2015 | Matthews |
| 2017/0008375 A1 * | 1/2017 | Blatchley ............ H01M 10/615 |
| 2017/0008407 A1 * | 1/2017 | Porras .................... B60L 58/27 |
| 2017/0072813 A1 | 3/2017 | Martin et al. |
| 2017/0106726 A1 * | 4/2017 | Saroka ................. B60H 1/3232 |
| 2017/0369010 A1 * | 12/2017 | Tarte .................... B60W 50/085 |
| 2018/0065446 A1 | 3/2018 | Hansson et al. |
| 2018/0273018 A1 | 9/2018 | Follen et al. |
| 2018/0334170 A1 * | 11/2018 | Liu ....................... B60W 10/30 |
| 2019/0183438 A1 | 6/2019 | Lee et al. |
| 2019/0184483 A1 | 6/2019 | Lee et al. |
| 2019/0193523 A1 | 6/2019 | Takeuchi et al. |
| 2019/0219638 A1 * | 7/2019 | Witcraft ........... G01R 19/16542 |
| 2019/0283530 A1 * | 9/2019 | Adetola ............... G05B 13/024 |
| 2019/0291665 A1 | 9/2019 | Martin |
| 2019/0332149 A1 * | 10/2019 | Shelnutt ................ F24F 5/0046 |
| 2022/0072931 A1 * | 3/2022 | Chen .................... B60H 1/3232 |

FOREIGN PATENT DOCUMENTS

| | | |
|---|---|---|
| EP | 2031443 | 5/2016 |
| JP | 6351301 | 7/2018 |
| WO | 2006132070 | 12/2006 |
| WO | 2010/002644 | 1/2010 |
| WO | 2010009502 | 1/2010 |
| WO | 2010094302 | 8/2010 |
| WO | 2010145971 | 12/2010 |
| WO | 2011/078109 | 6/2011 |
| WO | 2014/002244 | 1/2014 |

* cited by examiner

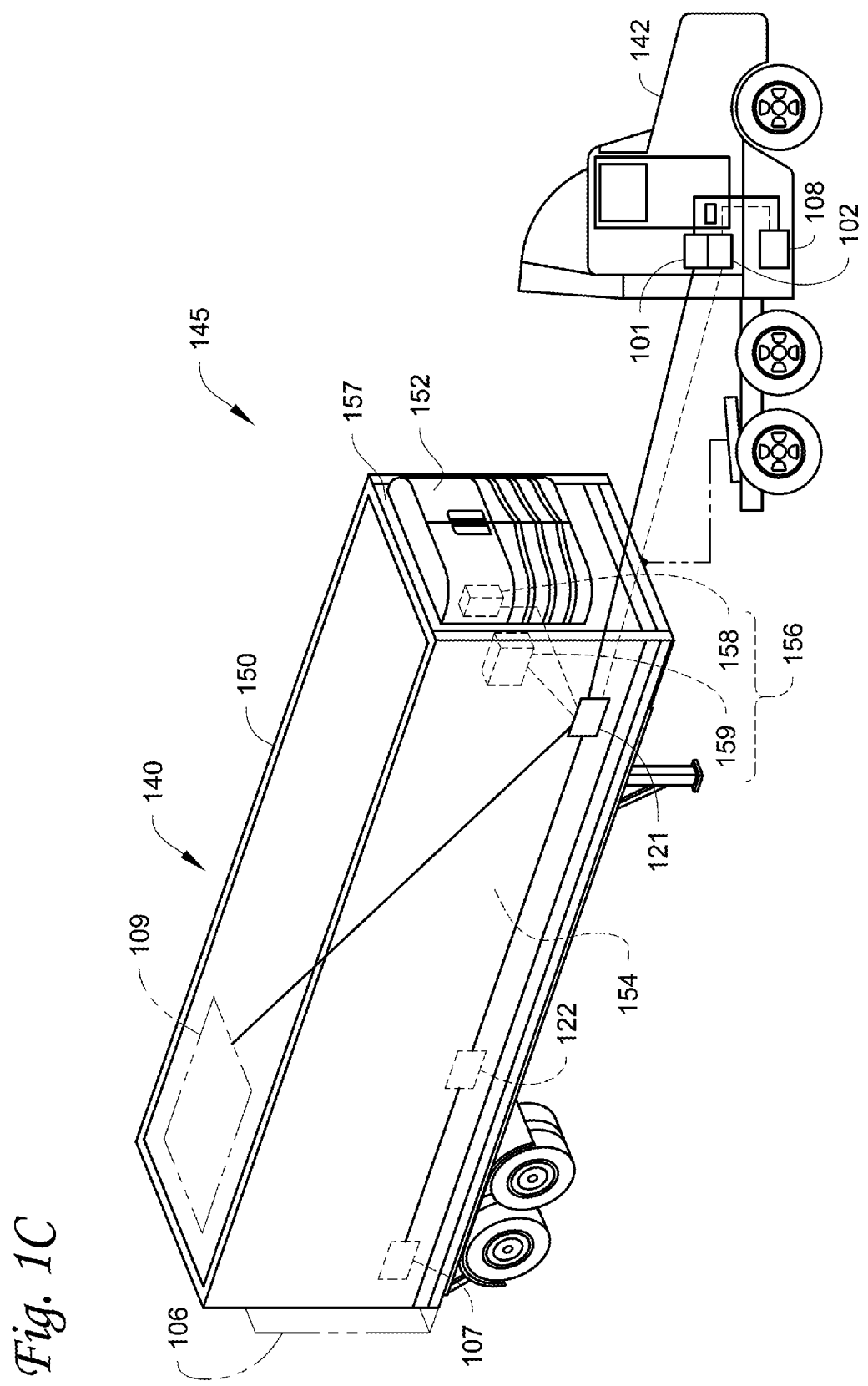

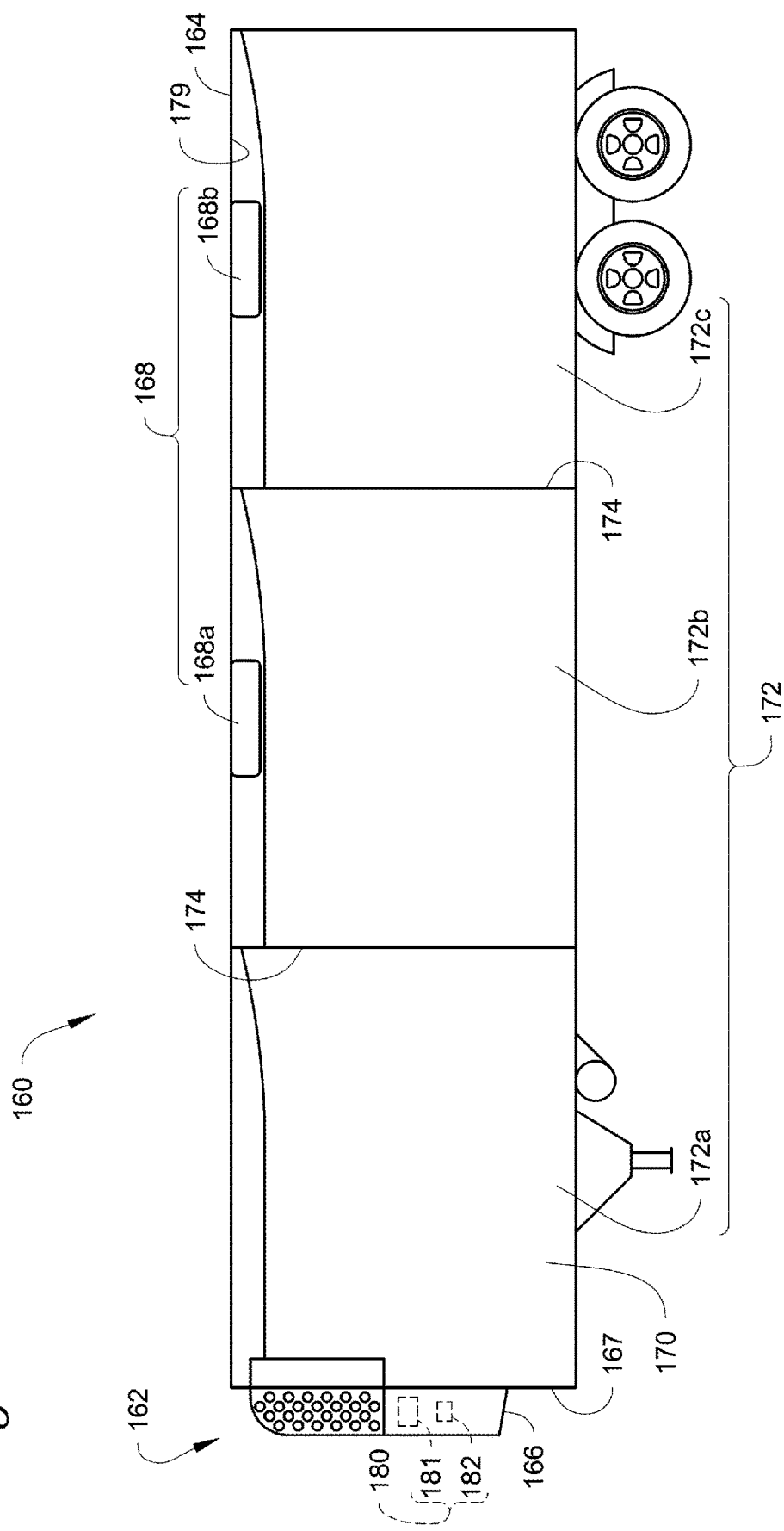

ELECTRICAL POWER SUPPLY MANAGEMENT FOR CLIMATE-CONTROLLED SYSTEM ASSOCIATED WITH AUTOMOTIVE APPLICATION

FIELD

The technologies disclosed and recited herein pertain generally to providing continuous and peak power balancing for operation of electrical accessories in an electrical system associated with at least one of a vehicle, trailer, and transport container that is at least partially electrically powered.

BACKGROUND

A transport climate-control system is generally used to control one or more environmental conditions (e.g., temperature, humidity, air quality, and the like) within a climate-controlled space of a transport unit (e.g., a truck, a container (such as a container on a flat car, an intermodal container, etc.), a box car, a semi-tractor, a bus, or other similar transport unit). The transport climate-control system may include, for example, a transport refrigeration system (TRS) and/or a heating, ventilation and air conditioning (HVAC) system. The TRS may control one or more environmental conditions within the climate-controlled space to maintain cargo (e.g., produce, frozen foods, pharmaceuticals, etc.); and the HVAC system may control one or more environmental conditions within the climate-controlled space to provide comfort for passengers travelling in the transport unit. In some transport units, the transport climate-control system may be installed externally (e.g., on a rooftop of the transport unit, on a front wall of the transport unit, etc.).

SUMMARY

The embodiments described and recited herein are directed to the delivering power to primary and accessory electrical components associated with a vehicle that is at least partially electrically powered, as well as to an power source of the vehicle itself.

To operate one or more of accessory electrical components in parallel to delivering power to a vehicle battery, via a power distribution unit, the embodiments described, recited, and suggested herein facilitate understanding dynamic power available to the accessory electrical components as well as the vehicle battery, and then distributing power in a prioritized manner to optimize the system for a most efficient power delivery process, with regards to power needs and power availability.

The embodiments described and recited herein utilize known communication signals from charging equipment as a basis for reducing unit current demand. That is, the control signal from an power source or supply equipment informs unit power draw decisions.

As defined herein, an accessory electrical component is an electrically powered accessory configured to be used with at least one of a vehicle, trailer, and a transport container.

In accordance with at least one embodiment, a method for managing power supplied to an electrical system associated with an automotive application, may be performed by a controller that is electrically connected to at least the electrical system. The method includes at least the following operations of connecting the electrical system to an electrical power source; determining a maximum current available from the electrical power source; prohibiting start-up for the electrical system when the determined maximum current available is less than a minimum amount of current for the electrical system to start-up; adjusting, e.g., restricting, power or current to the electrical system when the determined maximum current available exceeds a minimum amount of power or current for the electrical system to start-up but does not provide the expected steady state current; and removing any restrictions for the electrical system when the determined maximum current available is greater than the expected maximum current of the system.

In accordance with at least one other embodiment, a computer-readable medium stores executable instructions that may cause a power distribution controller that is electrically connected to both a power source and an electrical system to protect the electrical system and electrical supply equipment by performing functions that include, at least: receiving information indicating a maximum current available to the electrical system from the electrical power source; prohibiting start-up for the electrical system when the maximum current available to the electrical system from the electrical power source does not exceed a first threshold; adjusting electrical system operation to reduce current draw when the maximum current available to the electrical system from the electrical power source exceeds the first threshold but does not exceed a second threshold; and permitting unrestricted power from the electrical power source to the electrical system when the maximum current available to the electrical system from the electrical power source exceeds both the first threshold and the second threshold.

In accordance with at least one other embodiment, an power distribution unit for a vehicle that is at least partially electrically powered and a climate control unit that is used in a transport climate-control system, includes a controller. The controller may include a computer-readable medium that stores executable instructions that may cause an power distribution controller that is electrically connected to both an power source and an electrical system, to protect the electrical system and electrical supply equipment by performing functions that include, at least: receiving information indicating a maximum current available to the electrical system from the electrical power source; prohibiting start-up for the electrical system when the maximum current available to the electrical system from the electrical power source does not exceed a first threshold; adjusting, e.g., restricting, power or current from the electrical power source to the electrical system when the maximum current available to the electrical system from the electrical power source exceeds the first threshold but does not exceed a second threshold; and permitting unrestricted power or current from the electrical power source to the electrical system when the maximum current available to the electrical system from the electrical power source exceeds both the first threshold and the second threshold.

DRAWINGS

References are made to the accompanying drawings that form a part of this disclosure and which illustrate embodiments described in this specification. Various changes and modifications will become apparent to those skilled in the art from the following detailed description. The use of the same reference numbers in different figures indicates similar or identical items.

FIG. 1C illustrates a perspective view of a climate-controlled transport unit, with a transport climate-control system, attached to a tractor, according to at least one example embodiment described or recited herein.

FIG. 1D illustrates a side view of a climate-controlled transport unit with a multi-zone transport climate-control system, according to at least one example embodiment described or recited herein.

DETAILED DESCRIPTION

Figure 1A:
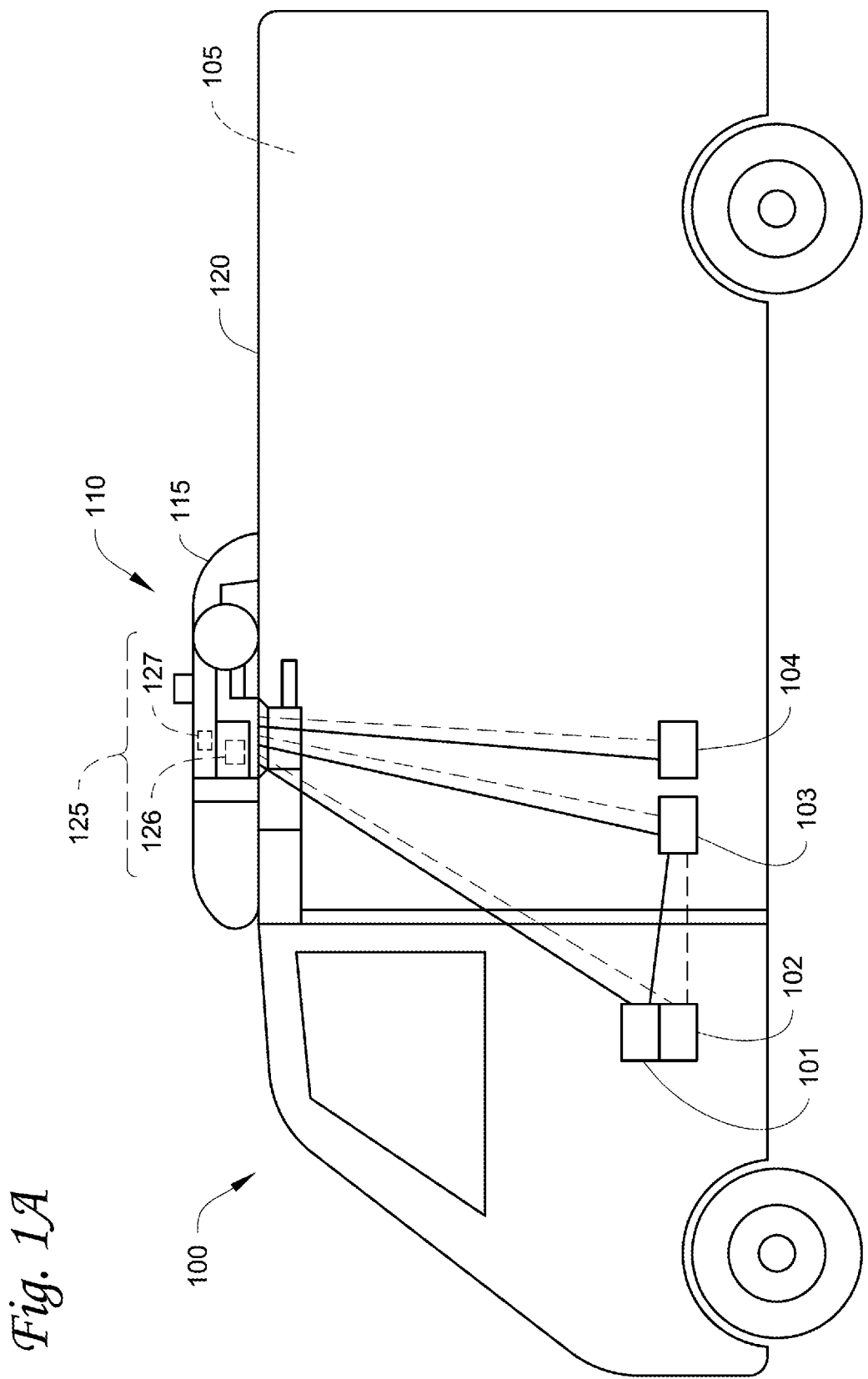
FIG. 1A illustrates a side view of a van with a transport climate-control system, according to at least one example embodiment described or recited herein.

The technologies disclosed and recited herein pertain generally to delivering power to primary and accessory electrical components associated with at least one of a vehicle, trailer, and transport container that is at least partially electrically powered, as well as to a power source of the vehicle itself.

Embodiments of this disclosure relate generally to a climate-control system for a transport unit. More particularly, the example embodiments described and recited herein pertain to utilizing a communication signal from the electrical supply equipment (ESE) to adjust to the current ramping profile of various electrical loads on a transport refrigeration or HVAC unit.

In the following detailed description, reference is made to the accompanying drawings, which are included as a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not intended to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

While the embodiments described below illustrate different embodiments of a transport climate-control system, it will be appreciated that the electrically powered accessory is not limited to the transport climate-control system or a climate control unit (CCU) of the transport climate-control system. It will be appreciated that a CCU may be, e.g., a transport refrigeration unit (TRU). In other embodiments, the electrically powered accessory may be, for example, a crane attached to a vehicle, a cement mixer attached to a truck, one or more food appliances of a food truck, a boom arm attached to a vehicle, a concrete pumping truck, a refuse truck, a fire truck (with a power driven ladder, pumps, lights, etc.), etc. It will be appreciated that the electrically powered accessory may require continuous operation even when the vehicle's ignition is turned off and/or the vehicle is parked, idling, and/or charging. The electrically powered accessory may further require substantial power to operate, continuous operation, and/or autonomous operation (e.g., controlling temperature/humidity/airflow of a climate-controlled space) on an as needed basis, independent of the vehicle's operational mode.

FIG. 1A depicts a climate-controlled van 100 that includes a climate-controlled space 105 for carrying cargo and a transport climate-control system 110 for providing climate control within the climate-controlled space 105. The transport climate-control system 110 includes a CCU 115 that is mounted to a rooftop 120 of the van 100. The transport climate-control system 110 may include, among other components, a climate control circuit (not shown) that connects, for example, a compressor, a condenser, an evaporator and an expansion device to provide climate control within the climate-controlled space 105. It is noted that the embodiments described herein are not limited to climate-controlled vans, but may apply to any type of transport unit (e.g., a truck, a container (such as a container on a flat car, an intermodal container, a marine container, etc.), a box car, a semi-tractor, a bus, or other similar transport unit), etc.

The transport climate-control system 110 also includes a programmable climate controller 125 and one or more sensors (not shown) that are configured to measure one or more parameters of the transport climate-control system 110 (e.g., an ambient temperature outside of the van 100, an ambient humidity outside of the van 100, a compressor suction pressure, a compressor discharge pressure, a supply air temperature of air supplied by the CCU 115 into the climate-controlled space 105, a return air temperature of air returned from the climate-controlled space 105 back to the CCU 115, a humidity within the climate-controlled space 105, etc.) and communicate parameter data to the climate controller 125. The climate controller 125 is configured to, at least, control operation of the transport climate-control system 110 including the components of the climate control circuit. The climate controller unit 125 may comprise a single integrated control unit 126 or may comprise a distributed network of climate controller elements 126, 127. The number of distributed control elements in a given network may depend upon the particular application of the principles described herein.

Climate controller 125 may be configured, programmed, or otherwise designed to manage power inputs from at least one of, e.g., electrical supply equipment and utility power source, etc., and to prioritize and control power flow to a vehicle and one or more electrical accessories e.g., climate-control unit.

Climate controller 125 may be further configured, programmed, or otherwise designed to communicate information received from electrical supply equipment to the vehicle and from the vehicle to the electrical supply equipment.

Controller 125 may communicate with electrical supply equipment using e.g., powerline communications, Pulse Width Modulation (PWM) communications, Local Interconnect Network (LIN) communications, Controller Area Network (CAN) communications, Pilot signal analog feedback, etc., to support, e.g., CCS, ChadeMO, Guobiao recommended-standard 20234, Tesla Supercharger, and/or other electrical supply equipment standards.

Communications between controller 125 and electrical supply equipment may include, e.g., a Control Pilot (CP) line and a Proximity Pilot (PP) line. The CP line may be used by, e.g., the controller to indicate, e.g., the power receiving level(s) of, e.g., the vehicle and/or electrically powered accessory, e.g., climate-control unit, to initiate receiving power and/or to communicate other information to electrical supply equipment.

As referenced herein, the CP may be used for power line carrier signaling (PLC), basic signaling, or high level communication (HLC). PLC may be utilized to communicate with a grid power supply to, e.g. receive parameters of a local power supply. A basic signal utilizes a 1 kHz PWM signal sent by a charging station to the vehicle over the CP signal. HLC utilizes either power line modulation over the CP, via a wired connection or LAN Ethernet network utilizing power contacts, or a wireless connection (e.g., Wi-Fi, Zigbee, etc.) to set up a connection between the ESE and the vehicle using, e.g., digital communication protocol ISO 15118. Both basic signaling and HLC allow the ESE to provide data to controller 125 indicating ESE's maximum current output. Then, a VFD, soft-starter, DC-DC converters, LDO, or other power electronics corresponding to controller 125 may be utilized to ramp AC or DC current to various electrical loads on a transport refrigeration or HVAC units and control the ramp rate based on the CP signal. Thus, the aforementioned power electronics may be disposed between the power supply, e.g., ESE, battery, etc., and the electrical load/accessory, e.g., motor, inverter, etc., and either internally calculate what a ramp rate should be or will receive that information from another controller that receives the control pilot signal.

Figure 4:
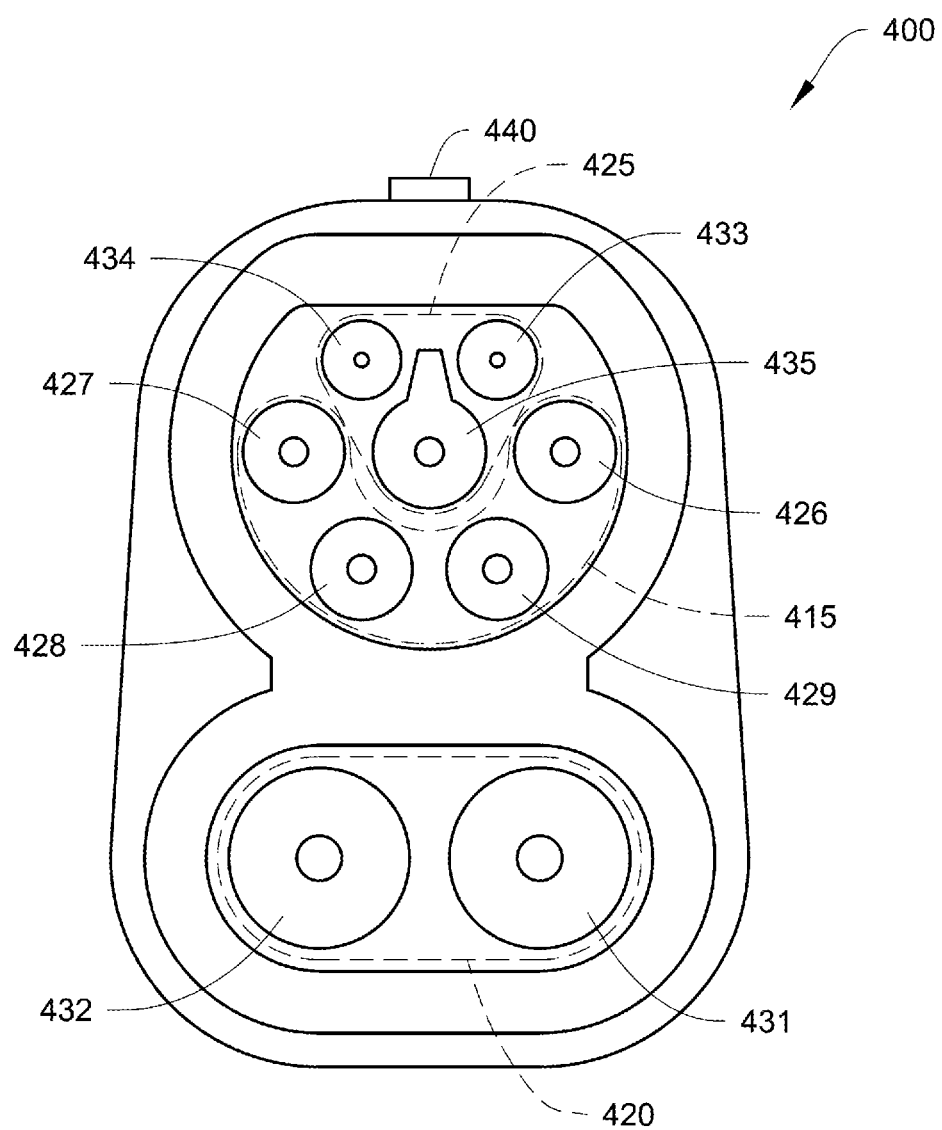
FIG. 4 illustrates a receptacle of an electrically powered accessory, according to one embodiment.

The PP line, i.e., Plug Present line, may be utilized to determine a status of a plug in a socket when a latch mechanism is utilized (see FIG. 4). Controller 125 may receive a signal upon the latch being pressed or closed to establish an appropriate power sequencing strategy. For example, when a latch being pressed is detected, power may be ramped down to prevent current spikes, which may cause damage to one or more components of the electrical load. The rapid change in current, as with the inrush, may lead to operational dysfunction; as well as a voltage spike from an inductance in the electrical load, causing damage.

Communications between controller 125 and electrical supply equipment may further include utilizing the Vehicle to Grid (V2G) protocol described and implemented in technical specification SAE J2836 for plug-in electric vehicles (PEV), incorporated herein by reference.

Even further, communications between controller 125 and electrical supply equipment may further include utilizing communication via a smart power profile, as described and implemented in technical specification SAE J2847, incorporated herein by reference.

Figure 2A:
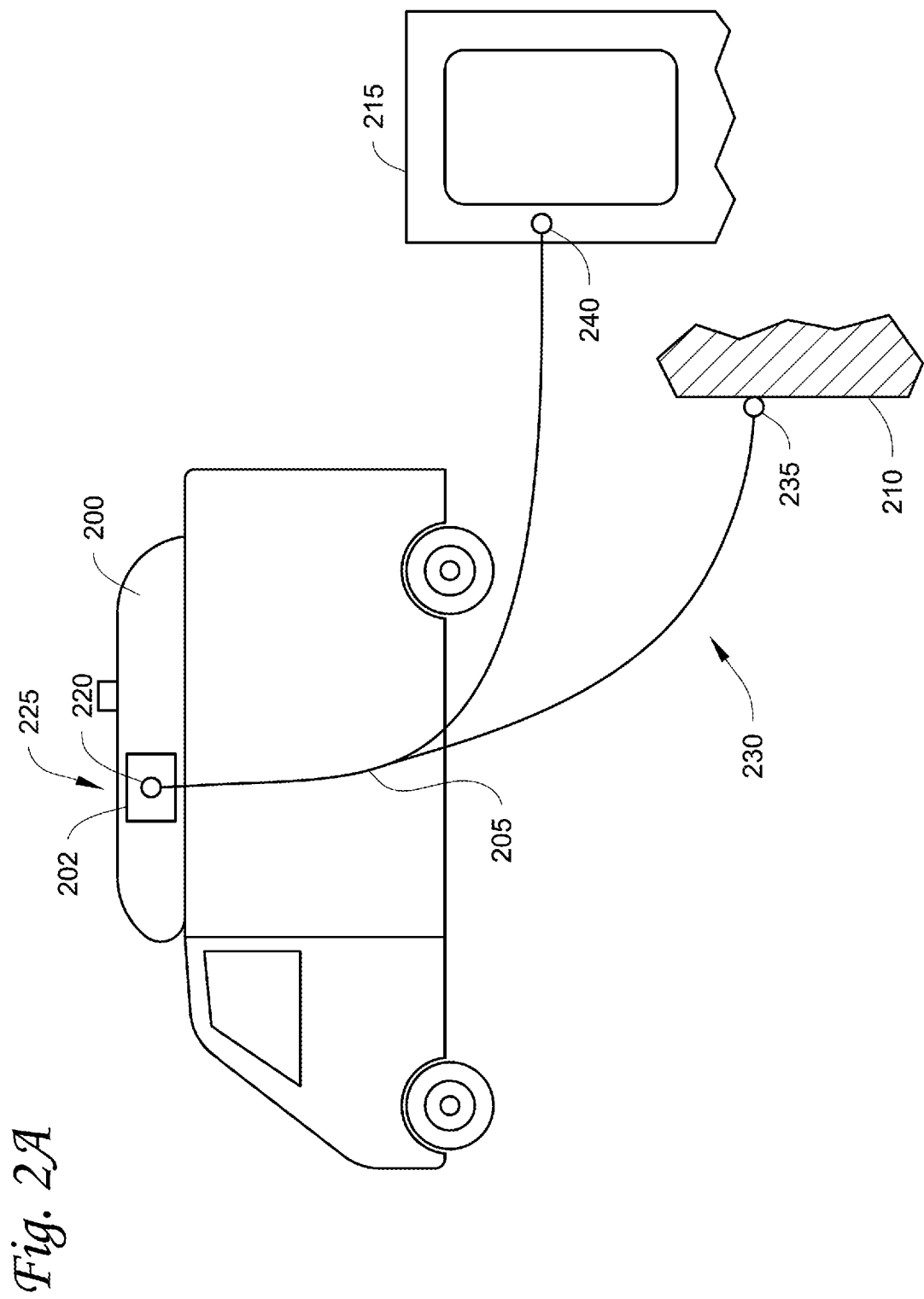
FIGS. 2A and 2B illustrate schematic diagrams of an electrically powered accessory that is connected to an AC power source and a DC power source via an optimized power cord, according to various embodiments described or recited herein.
Figure 2B:
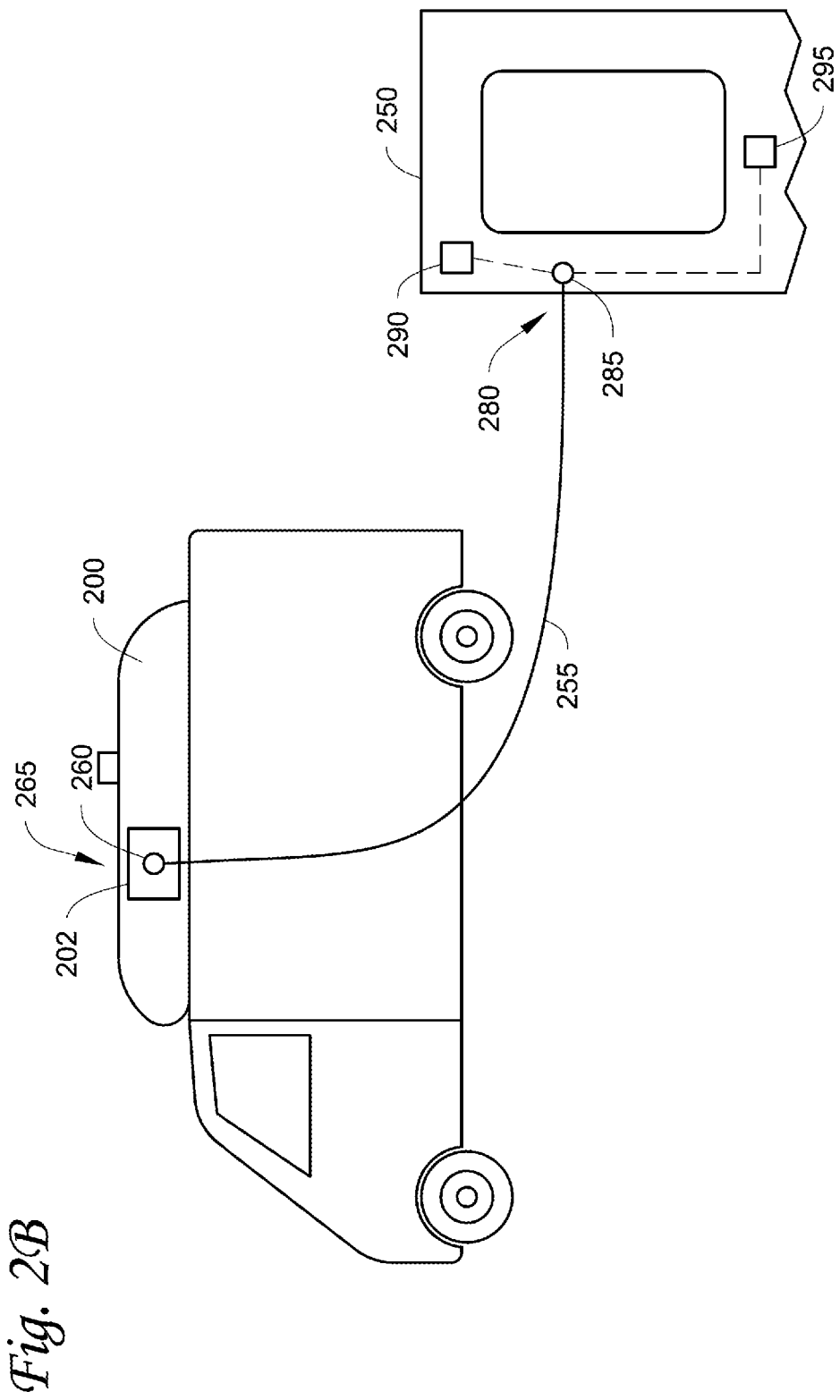
Figure 3A:
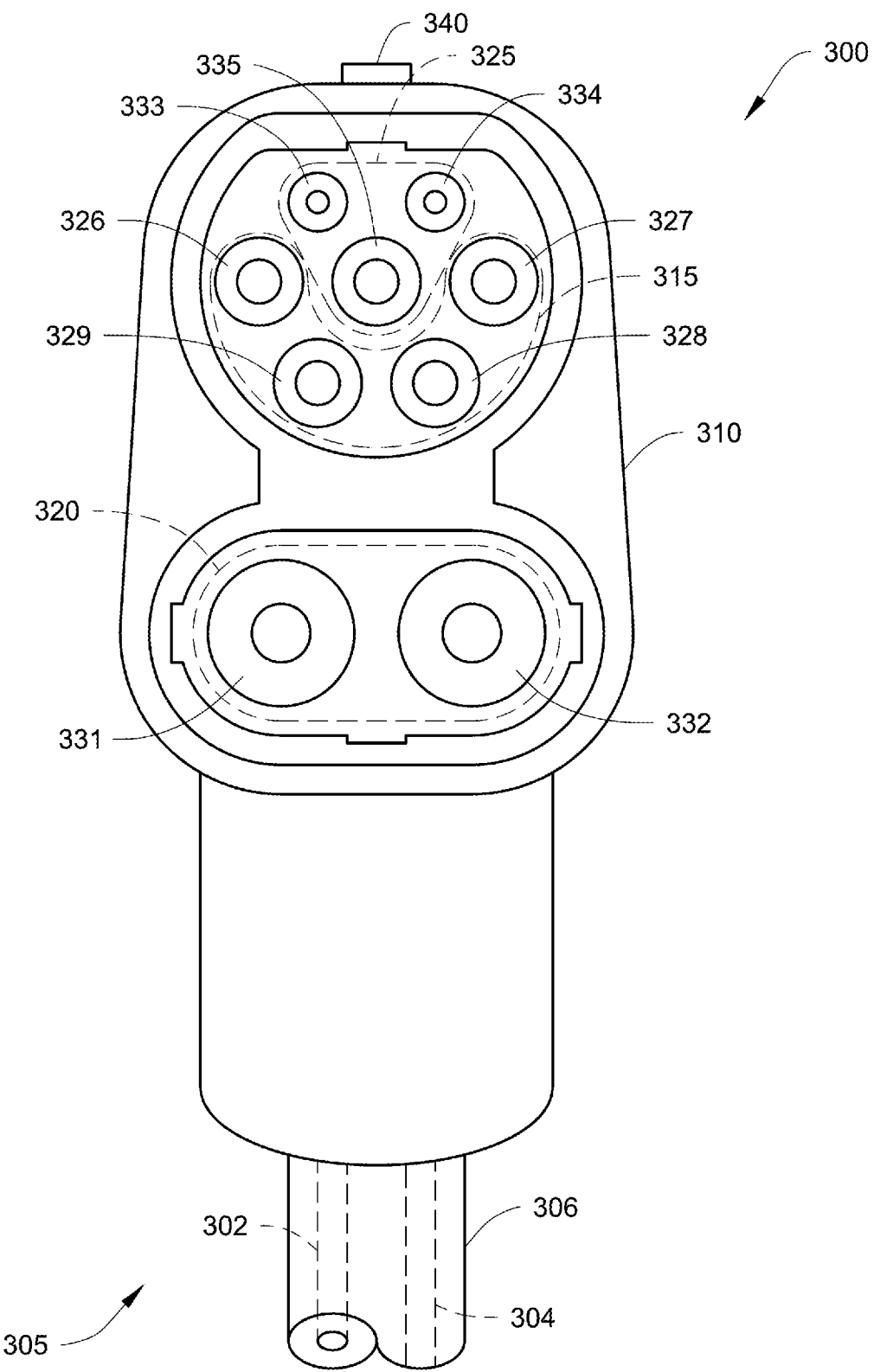
FIGS. 3A and 3B illustrate different embodiments of a first end of an optimized power cord.
Figure 3B:
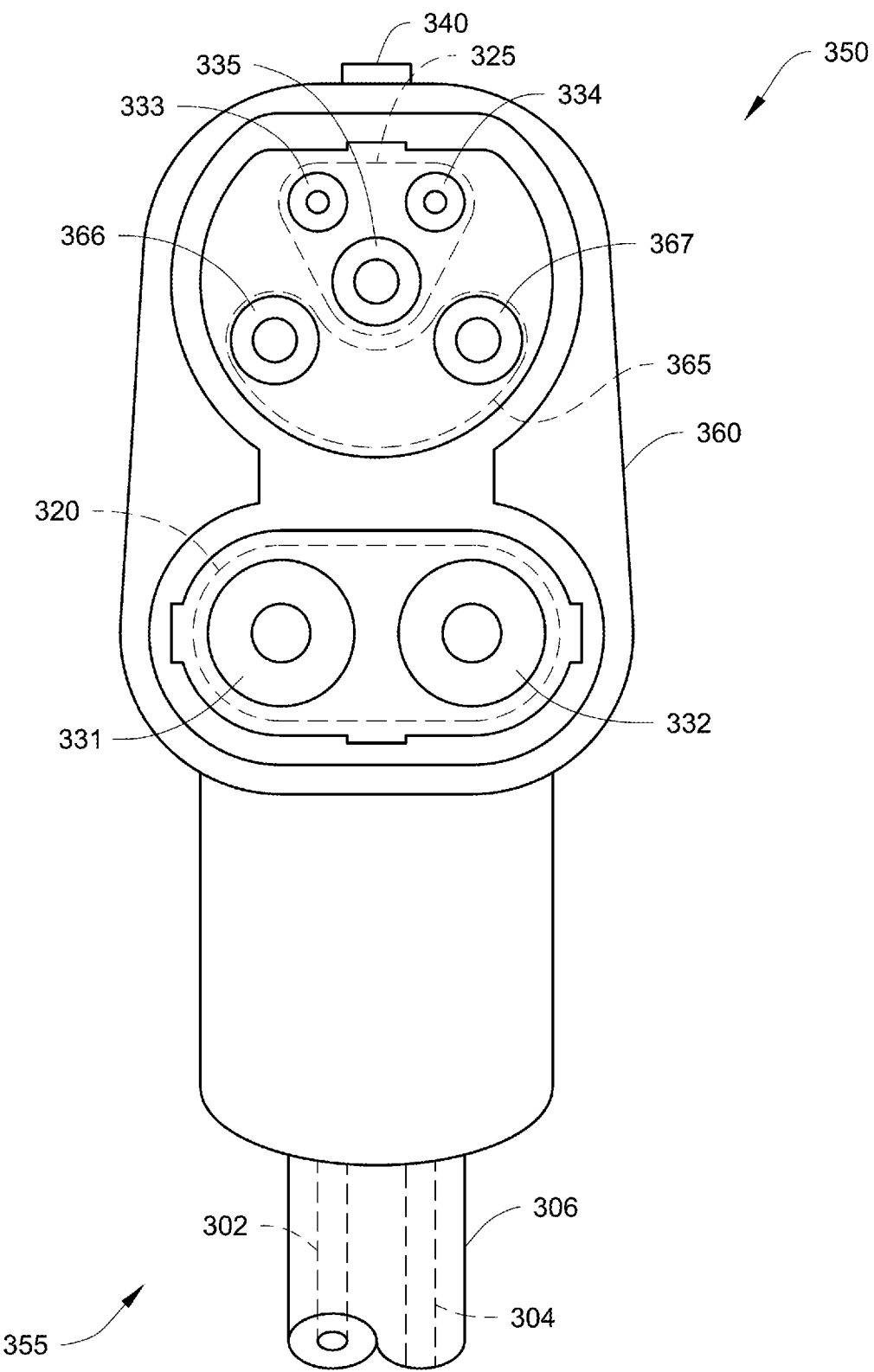

The climate-controlled van 100 may also include a vehicle PDU (power distribution unit) 101, a VES (vehicle energy source) 102, a standard charging port 103, and/or an enhanced charging port 104 (see FIGS. 3A and 3B for the detailed description about the standard charging port and the enhanced charging port). The VES 102 may include a controller (not shown). The vehicle PDU 101 may include a controller (not shown). In one embodiment, the vehicle PDU controller may be a part of the VES controller or vice versa. In one embodiment, power may be distributed from e.g., an EVSE (not shown), via the standard charging port 103, to the vehicle PDU 101. Power may also be distributed from the vehicle PDU 101 to an electrical supply equipment (ESE, not shown) and/or to the CCU 115 (see solid lines for power lines and dotted lines for communication lines). In another embodiment, power may be distributed from e.g., an EVSE (not shown), via the enhanced charging port 104, to an ESE (not shown) and/or to the CCU 115. The ESE may then distribute power to the vehicle PDU 101 via the standard charging port 103. See FIGS. 2, 3A, and 3B for a more detailed discussion of the ESE.

Figure 1B:
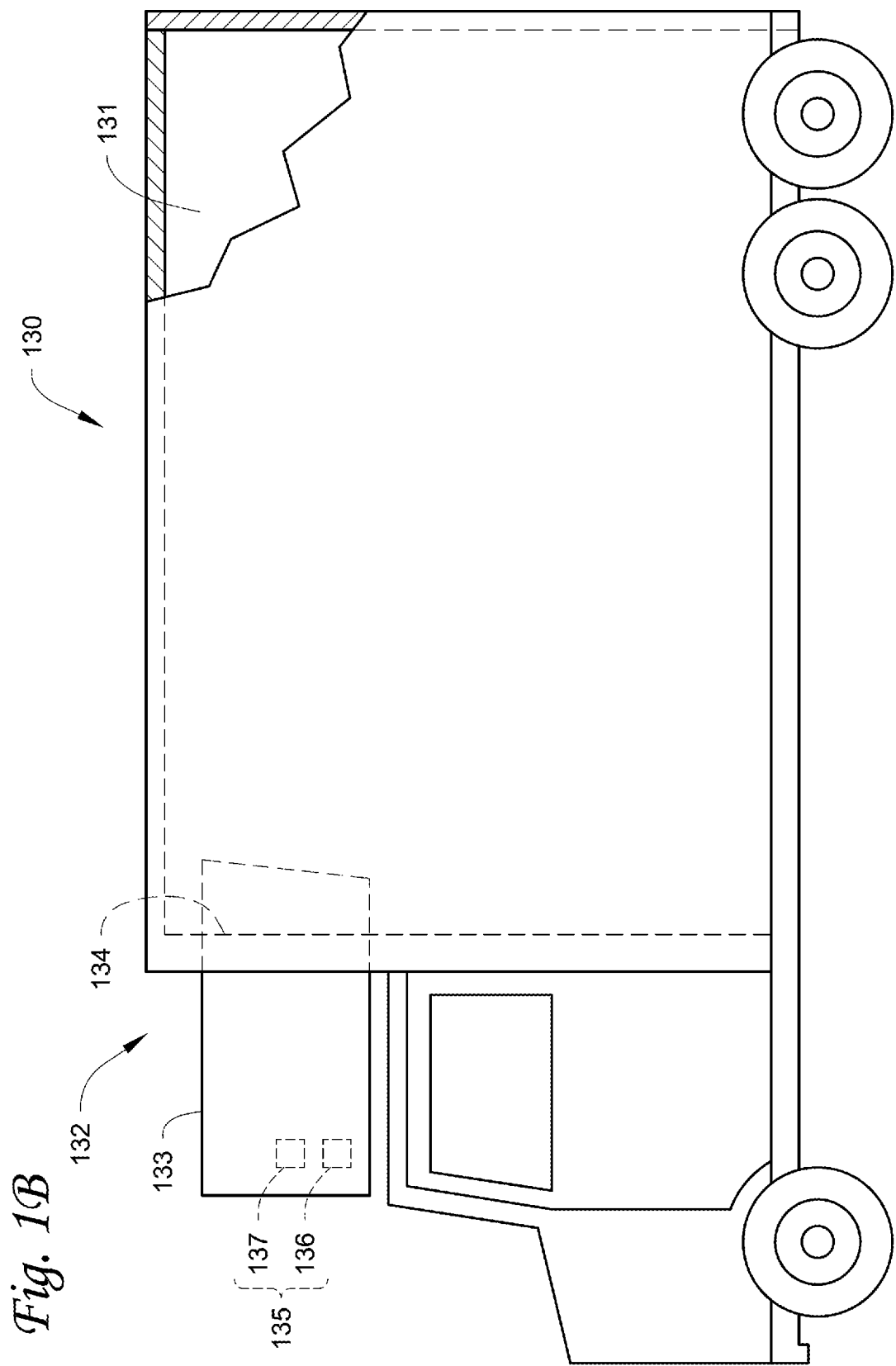
FIG. 1B illustrates a side view of a truck with a transport climate-control system, according to at least one example embodiment described or recited herein.

FIG. 1B depicts a climate-controlled straight truck 130 that includes a climate-controlled space 131 for carrying cargo and a transport climate-control system 132. The transport climate-control system 132 includes a CCU 133 that is mounted to a front wall 134 of the climate-controlled space 131. The CCU 133 may include, amongst other components, a climate control circuit (not shown) that connects, for example, a compressor, a condenser, an evaporator and an expansion device to provide climate control within the climate-controlled space 131.

The transport climate-control system 132 also includes a programmable climate controller 135 and one or more sensors (not shown) that are configured to measure one or more parameters of the transport climate-control system 132 (e.g., an ambient temperature outside of the truck 130, an ambient humidity outside of the truck 130, a compressor suction pressure, a compressor discharge pressure, a supply air temperature of air supplied by the CCU 133 into the climate-controlled space 131, a return air temperature of air returned from the climate-controlled space 131 back to the CCU 133, a humidity within the climate-controlled space 131, etc.) and communicate parameter data to the climate controller 135. The climate controller 135 is configured to, at least, control operation of the transport climate-control system 132 including components of the climate control circuit. The climate controller 135 may comprise a single integrated control unit 136 or may comprise a distributed network of climate controller elements 136, 137. The number of distributed control elements in a given network may depend upon the particular application of the principles described herein.

Climate controller 135 may be configured, programmed, or otherwise designed to manage power inputs from at least one of, e.g., electrical supply equipment and utility power source, etc., and to prioritize and control power flow to a vehicle and one or more electrical accessories e.g., climate-control unit.

Climate controller 135 may be further configured, programmed, or otherwise designed to communicate information received from electrical supply equipment to the vehicle and from the vehicle to the electrical supply equipment.

Controller 135 may communicate with electrical supply equipment using e.g., powerline communications, Pulse Width Modulation (PWM) communications, Local Interconnect Network (LIN) communications, Controller Area Network (CAN) communications, Pilot signal analog feedback, etc., to support, e.g., CCS, ChadeMO, Guobiao recommended-standard 20234, Tesla Supercharger, and/or other electrical supply equipment standards.

As referenced herein, the CP may be used for basic signaling or high level communication (HLC). A basic signal utilizes a 1 kHz PWM signal sent by a charging station to the vehicle over the CP signal. HLC utilizes either power line modulation over the CP or a wireless connection (e.g., Wi-Fi, Zigbee, etc.) to set up a connection between the ESE and the vehicle using, e.g., digital communication protocol ISO 15118. Both basic signaling and HLC allow the ESE to provide data to controller 135 indicating ESE's maximum current output. Then, a VFD, soft-starter, DC-DC converters, LDO, or other power electronics corresponding to controller 135 may be utilized to ramp AC or DC current to various electrical loads on a transport refrigeration or HVAC units and control the ramp rate based on the CP signal. Thus, the aforementioned power electronics may be disposed between the power supply, e.g., ESE, battery, etc., and the electrical load/accessory, e.g., motor, inverter, etc., and either internally calculate what a ramp rate should be or will receive that information from another controller that receives the control pilot signal. Alternatively, an inrush limiting resistor, e.g., of positive temperature coefficient, may be utilized to limit the current rate of change to be less than the peak threshold from power source. An additional switch may short-cut the resistance when the current rate limitation is no longer needed, as determined by the controller.

The PP line, i.e., Plug Present line, may be utilized to determine a status of a plug in a socket. Controller 135 may receive a signal upon the latch being pressed or closed to establish an appropriate power sequencing strategy. For example, when a latch being pressed is detected, power may be ramped down to prevent current spikes, which may cause damage to one or more components of the electrical load. The rapid change in current, as with the inrush, may lead to operational dysfunction; as well as a voltage spike from an inductance in the electrical load, causing damage.

Communications between controller 135 and electrical supply equipment may further include utilizing the Vehicle to Grid (V2G) protocol described and implemented in technical specification SAE J2836 for plug-in electric vehicles (PEV), incorporated herein by reference.

Even further, communications between controller 135 and electrical supply equipment may further include utilizing communication via a smart energy profile, as described and implemented in technical specification SAE J2847, incorporated herein by reference.

Similar to the climate-controlled van 100 shown in FIG. 1A, the climate-controlled straight truck 130 of FIG. 1B may also include a vehicle PDU (such as the vehicle PDU 101 shown in FIG. 1A), a VES (such as the VES 102 shown in FIG. 1A), a standard charging port (such as the standard charging port 103 shown in FIG. 1A), and/or an enhanced charging port (e.g., the enhanced charging port 104 shown in FIG. 1A), communicating with and distribute power from/to the corresponding ESE and/or the CCU 133.

FIG. 1C illustrates one embodiment of a climate-controlled transport unit 140 attached to a tractor 142. The climate-controlled transport unit 140 includes a transport climate-control system 145 for a transport unit 150. The tractor 142 is attached to and is configured to tow the transport unit 150. The transport unit 150 shown in FIG. 1C is a trailer.

The transport climate-control system 145 includes a CCU 152 that provides environmental control (e.g. temperature, humidity, air quality, etc.) within a climate-controlled space 154 of the transport unit 150. The CCU 152 is disposed on a front wall 157 of the transport unit 150. In other embodiments, it will be appreciated that the CCU 152 may be disposed, for example, on a rooftop or another wall of the transport unit 150. The CCU 152 includes a climate control circuit (not shown) that connects, for example, a compressor, a condenser, an evaporator and an expansion device to provide conditioned air within the climate-controlled space 154.

The transport climate-control system 145 also includes a programmable climate controller 156 and one or more sensors (not shown) that are configured to measure one or more parameters of the transport climate-control system 145 (e.g., an ambient temperature outside of the transport unit 150, an ambient humidity outside of the transport unit 150, a compressor suction pressure, a compressor discharge pressure, a supply air temperature of air supplied by the CCU 152 into the climate-controlled space 154, a return air temperature of air returned from the climate-controlled space 154 back to the CCU 152, a humidity within the climate-controlled space 154, etc.) and communicate parameter data to the climate controller 156. The climate controller 156 is configured to, at least, control operation of the transport climate-control system 145 including components of the climate control circuit. The climate controller 156 may comprise a single integrated control unit 158 or may comprise a distributed network of climate controller elements 158, 159. The number of distributed control elements in a given network may depend upon the particular application of the principles described herein.

Climate controller 156 may be configured, programmed, or otherwise designed to manage power inputs from at least one of, e.g., electrical supply equipment and utility power source, etc., and to prioritize and control power flow to a vehicle and one or more electrical accessories e.g., climate-control unit.

Climate controller 156 may be further configured, programmed, or otherwise designed to communicate information received from electrical supply equipment to the vehicle and from the vehicle to the electrical supply equipment.

Controller 156 may communicate with electrical supply equipment using e.g., powerline communications, Pulse Width Modulation (PWM) communications, Local Interconnect Network (LIN) communications, Controller Area Network (CAN) communications, Pilot signal analog feedback, etc., to support, e.g., CCS, ChadeMO, Guobiao recommended-standard 20234, Tesla Supercharger, and/or other electrical supply equipment standards.

As referenced herein, the CP may be used for basic signaling or high level communication (HLC). A basic signal utilizes a 1 kHz PWM signal sent by a charging station to the vehicle over the CP signal. HLC utilizes either power line modulation over the CP or a wireless connection (e.g., Wi-Fi, Zigbee, etc.) to set up a connection between the ESE and the vehicle using, e.g., digital communication protocol ISO 15118. Both basic signaling and HLC allow the ESE to provide data to controller 156 indicating ESE's maximum current output. Then, a VFD, soft-starter, DC-DC converters, LDO, or other power electronics corresponding to controller 156 may be utilized to ramp AC or DC current to various electrical loads on a transport refrigeration or HVAC units and control the ramp rate based on the CP signal. Thus, the aforementioned power electronics may be disposed between the power supply, e.g., ESE, battery, etc., and the electrical load/accessory, e.g., motor, inverter, etc., and either internally calculate what a ramp rate should be or will receive that information from another controller that receives the control pilot signal.

The PP line, i.e., Plug Present line, may be utilized to determine a status of a plug in a socket.

Communications between controller 156 and electrical supply equipment may further include utilizing the Vehicle to Grid (V2G) protocol described and implemented in technical specification SAE J2836 for plug-in electric vehicles (PEV), incorporated herein by reference.

Even further, communications between controller 156 and electrical supply equipment may further include utilizing communication via a smart energy profile, as described and implemented in technical specification SAE J2847, incorporated herein by reference.

In some embodiments, the tractor 142 may include an optional APU 108. The optional APU 108 may be an electric auxiliary power unit (eAPU). Also, in some embodiments, the tractor 142 may also include a vehicle PDU 101 and a VES 102 (not shown). The APU 108 may provide power to the vehicle PDU 101 for distribution. It will be appreciated that for the connections, solid lines represent power lines and dotted lines represent communication lines. The climate-controlled transport unit 140 may include a PDU 121 connecting to power sources (including, for example, an optional solar power source 109; an optional power source 122 such as Genset, fuel cell, undermount power unit, auxiliary battery pack, etc.; and/or an optional liftgate battery 107, etc.) of the climate-controlled transport unit 140. The PDU 121 may include a PDU controller (not shown). The PDU controller may be a part of the climate controller 156. The PDU 121 may distribute power from the power sources of the climate-controlled transport unit 140 to e.g., the transport climate-control system 145. The climate-controlled transport unit 140 may also include an optional liftgate 106. The optional liftgate battery 107 may provide power to open and/or close the liftgate 106.

Similar to the climate-controlled van 100, the climate-controlled transport unit 140 attached to the tractor 142 of FIG. 1C may also include a VES (such as the VES 102 shown in FIG. 1A), a standard charging port (such as the standard charging port 103 shown in FIG. 1A), and/or an enhanced charging port (such as the enhanced charging port 104 shown in FIG. 1A), communicating with and distribute power from/to a corresponding ESE and/or the CCU 152.

FIG. 1D illustrates another embodiment of a climate-controlled transport unit 160. The climate-controlled transport unit 160 includes a multi-zone transport climate-control system (MTCS) 162 for a transport unit 164 that may be towed, for example, by a tractor (not shown). It will be appreciated that the embodiments described herein are not limited to tractor and trailer units, but may apply to any type of transport unit (e.g., a truck, a container (such as a container on a flat car, an intermodal container, a marine container, etc.), a box car, a semi-tractor, a bus, or other similar transport unit), etc.

The MTCS 162 includes a CCU 166 and a plurality of remote units 168 that provide environmental control (e.g. temperature, humidity, air quality, etc.) within a climate-controlled space 170 of the transport unit 164. The climate-controlled space 170 may be divided into a plurality of zones 172. The term "zone" means a part of an area of the climate-controlled space 170 separated by walls 174. The CCU 166 may operate as a host unit and provide climate control within a first zone 172a of the climate-controlled space 166. The remote unit 168a may provide climate control within a second zone 172b of the climate-controlled space 170. The remote unit 168b may provide climate control within a third zone 172c of the climate-controlled space 170. Accordingly, the MTCS 162 may be used to separately and independently control environmental condition(s) within each of the multiple zones 172 of the climate-controlled space 162.

The CCU 166 is disposed on a front wall 167 of the transport unit 160. In other embodiments, it will be appreciated that the CCU 166 may be disposed, for example, on a rooftop or another wall of the transport unit 160. The CCU 166 includes a climate control circuit (not shown) that connects, for example, a compressor, a condenser, an evaporator and an expansion device to provide conditioned air within the climate-controlled space 170. The remote unit 168a is disposed on a ceiling 179 within the second zone 172b and the remote unit 168b is disposed on the ceiling 179 within the third zone 172c. Each of the remote units 168 a,b include an evaporator (not shown) that connects to the rest of the climate control circuit provided in the CCU 166.

The MTCS 162 also includes a programmable climate controller 180 and one or more sensors (not shown) that are configured to measure one or more parameters of the MTCS 162 (e.g., an ambient temperature outside of the transport unit 164, an ambient humidity outside of the transport unit 164, a compressor suction pressure, a compressor discharge pressure, supply air temperatures of air supplied by the CCU 166 and the remote units 168 into each of the zones 172, return air temperatures of air returned from each of the zones 172 back to the respective CCU 166 or remote unit 168a or 168b, a humidity within each of the zones 118, etc.) and communicate parameter data to a climate controller 180. The climate controller 180 is configured to, at least, control operation of the MTCS 162 including components of the climate control circuit. The climate controller 180 may comprise a single integrated control unit 181 or may comprise a distributed network of climate controller elements 181, 182. The number of distributed control elements in a given network may depend upon the particular application of the principles described herein.

Climate controller 180 may be configured, programmed, or otherwise designed to manage power inputs from at least one of, e.g., electrical supply equipment and utility power source, etc., and to prioritize and control power flow to a vehicle and one or more electrical accessories e.g., climate-control unit.

Climate controller 180 may be further configured, programmed, or otherwise designed to communicate information received from electrical supply equipment to the vehicle and from the vehicle to the electrical supply equipment.

Controller 180 may communicate with electrical supply equipment using e.g., powerline communications, Pulse Width Modulation (PWM) communications, Local Interconnect Network (LIN) communications, Controller Area Network (CAN) communications, Pilot signal analog feedback, etc., to support, e.g., CCS, ChadeMO, Guobiao recommended-standard 20234, Tesla Supercharger, and/or other electrical supply equipment standards.

As referenced herein, the CP may be used for basic signaling or high level communication (HLC). A basic signal utilizes a 1 kHz PWM signal sent by a charging station to the vehicle over the CP signal. HLC utilizes either power line modulation over the CP or a wireless connection (e.g., Wi-Fi, Zigbee, etc.) to set up a connection between the ESE and the vehicle using, e.g., digital communication protocol ISO 15118. Both basic signaling and HLC allow the ESE to provide data to controller 180 indicating ESE's maximum current output. Then, a voltage and/or current controlling device, e.g., a VFD, soft-starter, DC-DC converters, or other power electronics corresponding to controller 180, may be utilized to ramp AC or DC current to various electrical loads on a transport refrigeration or HVAC units and control the ramp rate based on the CP signal. Thus, the aforementioned power electronics may be disposed between the power supply, e.g., ESE, battery, etc., and the electrical load/accessory, e.g., motor, inverter, etc., and either internally calculate what a ramp rate should be or will receive that information from another controller that receives the control pilot signal.

The PP line, i.e., Plug Present line, may be utilized to determine a status of a plug in a socket. Controller 180 may receive a signal upon the latch being pressed or closed to establish an appropriate power sequencing strategy. For example, when a latch being pressed is detected, power may be ramped down to prevent current spikes, which may cause damage to one or more components of the electrical load. The rapid change in current, as with the inrush, may lead to operational dysfunction; as well as a voltage spike from an inductance in the electrical load, causing damage.

Communications between controller 180 and electrical supply equipment may further include utilizing the Vehicle to Grid (V2G) protocol described and implemented in technical specification SAE J2836 for plug-in electric vehicles (PEV), incorporated herein by reference.

Even further, communications between controller 180 and electrical supply equipment may further include utilizing communication via a smart energy profile, as described and implemented in technical specification SAE J2847, incorporated herein by reference.

Similar to the climate-controlled van 100, the climate-controlled transport unit 160 of FIG. 1D may also include a vehicle PDU (such as the vehicle PDU 101 shown in FIG. 1A), a VES (such as the VES 102 shown in FIG. 1A), a standard charging port (such as the standard charging port 103 shown in FIG. 1A), and/or an enhanced charging port (e.g., the enhanced charging port 104 shown in FIG. 1A), communicating with and distribute power from/to the corresponding ESE and/or the CCU 166.

Figure 1E:
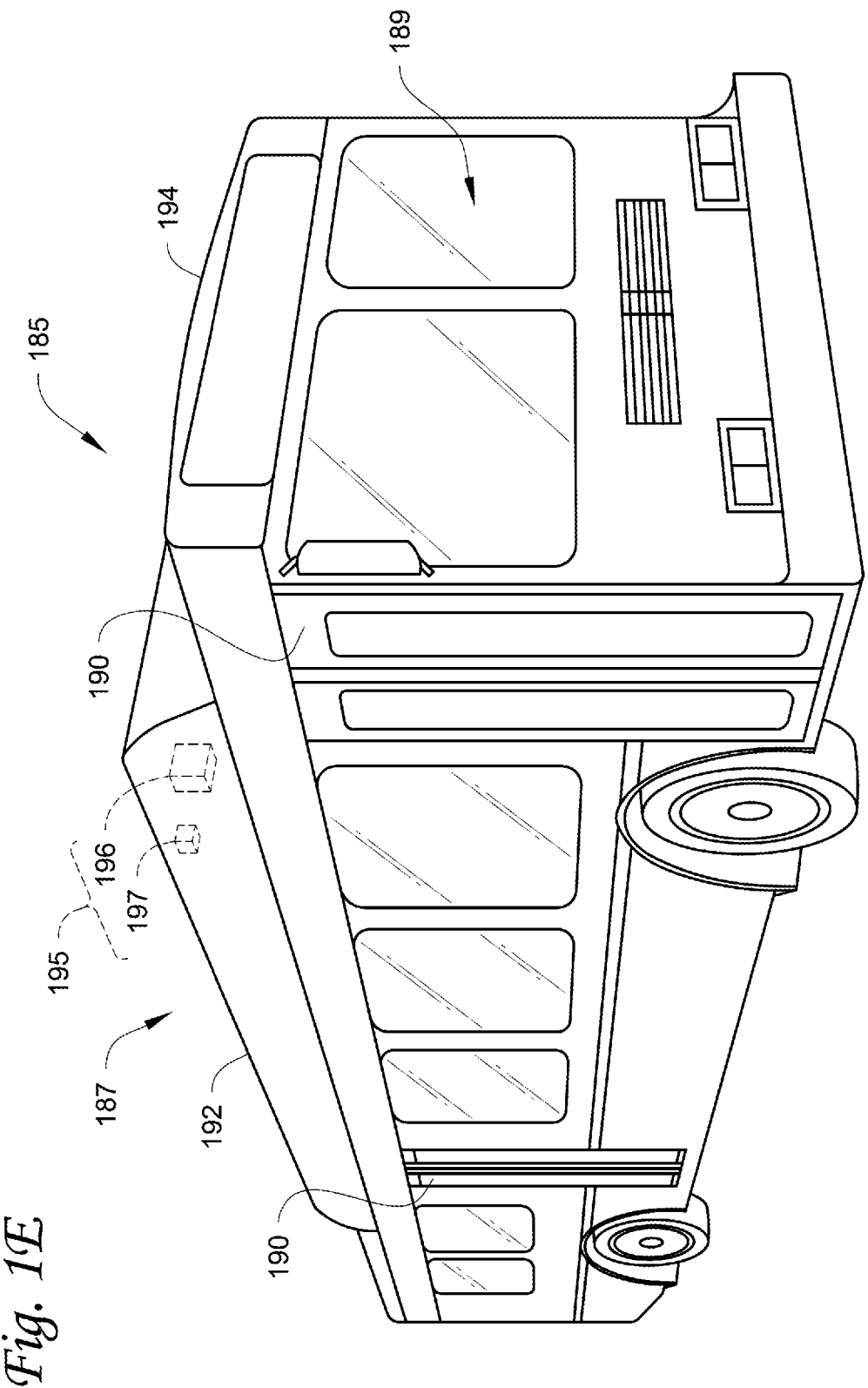
FIG. 1E illustrates a perspective view of a passenger vehicle including a transport climate-control system, according to at least one example embodiment described or recited herein.

FIG. 1E is a perspective view of a vehicle 185 including a transport climate-control system 187, according to one embodiment. The vehicle 185 is a mass-transit bus that may carry passenger(s) (not shown) to one or more destinations. In other embodiments, the vehicle 185 may be a school bus, railway vehicle, subway car, or other commercial vehicle that carries passengers. The vehicle 185 includes a climate-controlled space (e.g., passenger compartment) 189 supported that may accommodate a plurality of passengers. The vehicle 185 includes doors 190 that are positioned on a side of the vehicle 185. In the embodiment shown in FIG. 1E, a first door 190 is located adjacent to a forward end of the vehicle 185, and a second door 190 is positioned towards a rearward end of the vehicle 185. Each door 190 is movable between an open position and a closed position to selectively allow access to the climate-controlled space 189. The transport climate-control system 187 includes a CCU 192 attached to a roof 194 of the vehicle 185.

The CCU 192 includes a climate control circuit (not shown) that connects, for example, a compressor, a condenser, an evaporator and an expansion device to provide conditioned air within the climate-controlled space 189. The transport climate-control system 187 also includes a programmable climate controller 195 and one or more sensors (not shown) that are configured to measure one or more parameters of the transport climate-control system 187 (e.g., an ambient temperature outside of the vehicle 185, a space temperature within the climate-controlled space 189, an ambient humidity outside of the vehicle 185, a space humidity within the climate-controlled space 189, etc.) and communicate parameter data to the climate controller 195. The climate controller 195 is configured to, at least, control operation of the transport climate-control system 187 including components of the climate control circuit. The climate controller 195 may comprise a single integrated control unit 196 or may comprise a distributed network of climate controller elements 196, 197. The number of distributed control elements in a given network may depend upon the particular application of the principles described herein.

Climate controller 195 may be configured, programmed, or otherwise designed to manage power inputs from at least one of, e.g., electrical supply equipment and utility power source, etc., and to prioritize and control power flow to a vehicle and one or more electrical accessories e.g., climate-control unit.

Climate controller 195 may be further configured, programmed, or otherwise designed to communicate information received from electrical supply equipment to the vehicle and from the vehicle to the electrical supply equipment.

Controller 195 may communicate with electrical supply equipment using e.g., powerline communications, Pulse Width Modulation (PWM) communications, Local Interconnect Network (LIN) communications, Controller Area Network (CAN) communications, Pilot signal analog feedback, etc., to support, e.g., CCS, ChadeMO, Guobiao recommended-standard 20234, Tesla Supercharger, and/or other electrical supply equipment standards.

As referenced herein, the CP may be used for basic signaling or high level communication (HLC). A basic signal utilizes a 1 kHz PWM signal sent by a charging station to the vehicle over the CP signal. HLC utilizes either power line modulation over the CP or a wireless connection (e.g., Wi-Fi, Zigbee, etc.) to set up a connection between the ESE and the vehicle using, e.g., digital communication protocol ISO 15118. Both basic signaling and HLC allow the ESE to provide data to controller 195 indicating ESE's maximum current output. Then, a VFD, soft-starter, DC-DC converters, LDO, or other power electronics corresponding to controller 195 may be utilized to ramp AC or DC current to various electrical loads on a transport refrigeration or HVAC units and control the ramp rate based on the CP signal. Thus, the aforementioned power electronics may be disposed between the power supply, e.g., ESE, battery, etc., and the electrical load/accessory, e.g., motor, inverter, etc., and either internally calculate what a ramp rate should be or will receive that information from another controller that receives the control pilot signal.

The PP line, i.e., Plug Present line, may be utilized to determine a status of a plug in a socket. Controller 195 may receive a signal upon the latch being pressed or closed to establish an appropriate power sequencing strategy. For example, when a latch being pressed is detected, power may be ramped down to prevent current spikes, which may cause damage to one or more components of the electrical load. The rapid change in current, as with the inrush, may lead to operational dysfunction; as well as a voltage spike from an inductance in the electrical load, causing damage.

Communications between controller 195 and electrical supply equipment may further include utilizing the Vehicle to Grid (V2G) protocol described and implemented in technical specification SAE J2836 for plug-in electric vehicles (PEV), incorporated herein by reference.

Even further, communications between controller 195 and electrical supply equipment may further include utilizing communication via a smart energy profile, as described and implemented in technical specification SAE J2847, incorporated herein by reference.

Similar to the climate-controlled van 100, the vehicle 185 including a transport climate-control system 187 of FIG. 1E may also include a vehicle PDU (such as the vehicle PDU 101 shown in FIG. 1A), a VES (such as the VES 102 shown in FIG. 1A), a standard charging port (such as the standard charging port 103 shown in FIG. 1A), and/or an enhanced charging port (e.g., the enhanced charging port 104 shown in FIG. 1A), communicating with and distribute power from/to the corresponding ESE and/or the CCU 192.

In some embodiments, a CCU (e.g., the CCU 115, 133, 152, 166, 192) may be an electrically powered climate control unit. Also, in some embodiments, the CCU may include a rechargeable power storage device (not shown) that may provide power to a transport climate-control system (e.g., the transport climate-control systems 110, 132, 145, 162, 187). In some embodiments, the rechargeable power storage device may be charged by AC power (e.g., three-phase AC power, single phase AC power, etc.). In some embodiments, the rechargeable power storage device may be charged by DC power. In some embodiments, components of the transport climate-control system 110 (e.g., a compressor, one or more fans, one or more sensors, a controller, etc.) may require either AC power or DC power to operate. The CCU may include a receptacle (see FIG. 4) with an AC contact, a DC contact, and a communication contact for receiving a single plug at a first end of an optimized power cord. The second end of the optimized power cord have an AC plug that is connected to an AC power source and a DC plug that is connected to a DC power source that is separate from the AC power source. For example, in one embodiment, the AC power source may be a utility power source and the DC power source may be an electric vehicle charging station. In some embodiments, the AC plug at the second end of the optimized power cord may have a three-phase contact. In some embodiments, the AC plug at the second end of the optimized power cord may have a single-phase contact.

Related U.S. application Ser. No. 16/565,282, "OPTIMIZED POWER CORD FOR TRANSFERRING POWER TO A TRANSPORT CLIMATE-CONTROL SYSTEM," filed on Sep. 9, 2019, of which the description and drawings are incorporated herein by reference, may be referenced to supplement the description herein.

FIG. 2A illustrates a schematic diagram of a first embodiment of an electrically powered accessory 200 configured to be used with at least one of a vehicle, trailer, and a transport container that is connected to an AC power source 210 and a DC power source 215 via an optimized power cord 205. The electrically powered accessory 200 may be, for example, a CCU (e.g., the CCU 115, 133, 152, 166, 170 shown in FIGS. 1A-E). The electrically powered accessory 200 includes a receptacle 202 for receiving the optimized power cord 205. In some embodiments, the receptacle 202 may be part of a power distribution unit (not shown) of the electrically powered accessory 200 that may distribute AC power and DC power to various components of the electrically powered accessory 200 including, for example, a rechargeable power storage device (not shown). The power distribution unit may be electrically and/or communicatively connected between the AC power source 210 and the DC power source 215 at one end, and to the vehicle and/or to the CCU 200 at the other end. The structure and functionality of such a power distribution unit is described in more detail in U.S. application Ser. No. 16/565,205, "Transport Climate-control system with an Enhanced Power Distribution Unit for Managing Electrical Accessory Loads."

The AC power source 210 may be, for example, a utility power source. In some embodiments, the AC power source 210 may be a three-phase AC power source. In other embodiments, the AC power source 210 may be a single-phase power source. The DC power source 215 may be, for example, an electric vehicle charging station.

The optimized power cord 205 includes a first end 225 and a second end 230. The first end 225 of the optimized power cord 205 includes a single plug 220 that is connected to the receptacle 202 of the electrically powered accessory 200. The second end 230 of the optimized power cord 205 includes a first plug 235 that is connected to the AC power source 210 and includes a second plug 240 that is connected to the DC power source 215. Accordingly, the optimized power cord 205 may simultaneously provide both AC power and DC power from the AC power source 210 and the DC power source 215 to the electrically powered accessory 200 via a single plug 220 at the first end 225 of the optimized power cord 205. Details of the first end 225 of the optimized power cord 205 are described below with respect to FIGS. 3A and 3B.

FIG. 2B illustrates a schematic diagram of a second embodiment of the electrically powered accessory 200 configured to be used with at least one of a vehicle, trailer, and a transport container that is connected to an electrical supply equipment (ESE) (e.g., electric vehicle charging station) 250 that includes both the AC power source 210 and the DC power source 215 via an optimized power cord 255. As noted above, the electrically powered accessory 200 may be, for example, a CCU (e.g., the CCU 115, 133, 152, 166, 170 shown in FIGS. 1A-E). The electrically powered accessory 200 includes a receptacle 202 for receiving the optimized power cord 255. In some embodiments, the receptacle 202 may be part of a power distribution unit (not shown) of the electrically powered accessory 200 that may distribute AC power and DC power to various components of the electrically powered accessory 200 including, for example, a rechargeable power storage device (not shown).

The optimized power cord 255 includes a first end 265 and a second end 270. The first end 265 of the optimized power cord 255 includes a single plug 260 that is connected to the receptacle 202 of the electrically powered accessory 200. The second end 280 of the optimized power cord 255 also includes a single plug 285 that is connected to the ESE 250. The ESE 250 may internally include an AC power source 290 and a DC power source 295. Accordingly, the optimized power cord 255 may simultaneously provide both AC power and DC power from the ESE 250 to the electrically powered accessory 200 via the single plug 260 at the first end 265 of the optimized power cord 255 and the single plug 285 at the second end 280 of the optimized power cord 255.

Optimized power cords 205, 255 may connect to the AC power source 210, the DC power source 215, and the ESE 250 using one or a combination of a Mode 1 charging mode, a Mode 2 charging mode, a Mode 3 charging mode, and a Mode 4 charging mode.

In the Mode 1 charging mode from IEC 62196, the AC power source 210 and/or the ESE 250 may include a normal AC receptacle accepting, for example, a NEMA 16-20P plug, and provides no communication with the electrically powered accessory 200.

In the Mode 2 charging mode, the AC power source 210 and/or the ESE 250 may include a normal AC receptacle accepting, for example, NEMA 15-50P, and the optimized power cords 205, 255 may include communication with the electrically powered accessory.

In the Mode 3 charging mode, the AC power source 210 and/or the ESE 250 may be an AC pedestal or wall mount EVSE with the second end 230, 280 permanently affixed to the AC power source 210 and/or the ESE 250.

In the Mode 4 charging mode from IEC 62196, the DC power source 215 and/or the ESE 250 may provide DC charging with the second end 230, 280 permanently affixed to the DC power source 215 and/or the ESE 250.

Further, optimized power cords 205, 255 may concurrently connect a vehicle electrical system of the vehicle and/or the electrically powered accessory 200 to both the AC power source 210 and the DC power source 215 or to the ESE 250 at the same time. Accordingly, a rechargeable power storage device of the electrically powered accessory 200 may be simultaneously connected to the DC power source 215, 295 and a vehicle electrical system of the vehicle may be connected to the AC power source 210, 290 via the same optimized power cord 205, 255. Also, a rechargeable power storage device of the electrically powered accessory 200 may be simultaneously connected to the DC power source 215, 295 and a vehicle electrical system of the vehicle may be connected to the DC power source 215, 295 via the same optimized power cord 205, 255.

FIG. 3A illustrates a first end 305 of an optimized power cord 300 (e.g., the first ends 225, 265 of the optimized power cords 205, 255 shown in FIGS. 2A and 2B), according to at least one example embodiment. The optimized power cord 300 may include an AC wire 302, a DC wire 304, and a single plug 310 at the first end 305. The AC wire 302 transfers three-phase or single-phase AC power through the optimized power cord 300. The DC wire 304 transfers DC power through the optimized power cord 300. The AC wire 302 and the DC wire 304 may be bundled together within a single cable sheath 306 through the first end 305 of the optimized power cable 300 up to the single plug 310. The single plug 310 may be connected to a first end of the AC wire 302 and a first end of the DC wire 304. The single plug 310 includes an AC contact 315, a DC contact 320, and a communication contact 325. The first end 305 of the optimized power cord 300 may be configured to connect to an electrically powered accessory (e.g., the CCU 115, 133, 152, 166, 170 shown in FIGS. 1A-E and the electrically powered accessory 200 shown in FIG. 2) configured to be used with at least one of a vehicle, trailer, and a transport container.

The AC contact 315 may transfer three-phase AC power or single-phase AC power out of the optimized power cord 300. The AC contact 315 may include a neutral contact 326 and line phase contacts 327, 328, 329, each of which may supply a separate line phase of a three-phase AC power. When the AC contact 315 supplies single-phase AC power, the neutral contact 326 and one of the line phase contacts 327, 328, 329 (e.g., line phase contact 327) are utilized.

The DC contact 320 may be configured to transfer DC power out of the optimized power cord 300. The DC contact 320 includes a positive DC contact 331 and a negative DC contact 332.

The communication contact 325 may be configured to communicate with the electrically powered accessory. The communication contact 325 may include a control pilot contact 333 that provides post-insertion signaling, a proximity pilot contact 334 that provides post-insertion signaling, and a protective earth contact 335 that may provide a full-current protective earthing system. The protective earth contact 335 is a safety feature that may reduce electric shock potential when, for example, there is a faulty connection.

FIG. 3B illustrates a first end 355 of an optimized power cord 350, according to at least one other example embodiment. The optimized power cord 350 may include an AC wire 302, a DC wire 304, and a single plug 360 at the first end 355. The AC wire 302 may transfer single-phase AC power through the optimized power cord 350. The DC wire 304 transfers DC power through the optimized power cord 350. The AC wire 302 and the DC wire 304 may be bundled together within a single cable sheath 306 through the first end 355 of the optimized power cable 350 up to the single plug 360. The single plug 360 is connected to a first end of the AC wire 302 and a first end of the DC wire 304. The single plug 360 includes a single-phase AC contact 365, a DC contact 320, and a communication contact 325. The first end 355 of the optimized power cord 350 is configured to connect to an electrically powered accessory (e.g., the CCU 115, 133, 152, 166, 170 shown in FIGS. 1A-E and the electrically powered accessory 200 shown in FIG. 2).

The single-phase AC contact 365 may be configured to transfer single-phase AC power out of the optimized power cord 350. The single-phase AC contact 365 includes a neutral contact 366 and a line contact 367 supplying a line phase of a single-phase AC power.

The DC contact 320 may be configured to transfer DC power out of the optimized power cord 350. The DC contact 320 includes a positive DC contact 331 and a negative DC contact 332.

The communication contact 325 may be configured to communicate with the electrically powered accessory. The communication contact 325 includes a control pilot contact 333 that provides post-insertion signaling, a proximity pilot contact 334 that provides post-insertion signaling, and a protective earth contact 335 that may provide a full-current protective earthing system.

It will be appreciated that while the optimized power cords 300, 350 are shown using a Type 2 combo configuration reflecting VDE-AR-E 2623-2-2 plug specifications, it will be appreciated that in other embodiments the optimized power cords 300, 350 may use a Type 3 combo configuration reflecting EV Plug Alliance specifications and/or a fast charge coupler configuration reflecting, for example, CHAdeMO specifications. Also, in some embodiments, the optimized power cord 350 may use a Type 1 combo configuration reflecting SAE J1772/2009 automotive plug specifications.

The optimized power cords 300, 350 also include an unlock tab 340 that is configured to allow a user to detach the optimized power cord 300, 350 from a receptacle (e.g., the receptacle 400 shown in FIG. 4).

FIG. 4 illustrates one embodiment of a receptacle 400 of an electrically powered accessory (e.g., the CCU 115, 133, 152, 166, 170 shown in FIGS. 1A-E and the electrically powered accessory 200 shown in FIG. 2) configured to be used with at least one of a vehicle, trailer, and a transport container.

In some embodiments, the receptacle 400 may be part of a power distribution unit (not shown) of an electrically powered accessory (e.g., the electrically powered accessory 200 shown in FIG. 2) that may distribute AC power and DC power to various components of the electrically powered accessory including, for example, a rechargeable power storage device (not shown).

The receptacle 400 is configured to receive a single plug (e.g., the single plug 310, 360 shown in FIGS. 3A and 3B) of an optimized power cord (e.g., the optimized power cord 300, 350 shown in FIGS. 3A and 3B). The receptacle 400 may include an AC contact 415, a DC contact 420, and a communication contact 425.

The AC contact 415 may receive three-phase AC power or single-phase AC power from an optimized power cord (e.g., the optimized power cords 300, 350 shown in FIGS. 3A and 3B). The AC contact 415 includes a neutral contact 426 and line phase contacts 427, 428, 429, with each of the contacts 427, 428, 429 receiving a separate line phase of a three-phase AC power. When the AC contact 415 is receiving single-phase AC power, only the neutral contact 426 and one of the line phase contacts 427, 428, 429 (e.g., the line phase contact 427) may be used. Also, in some embodiments, when the AC contact 415 is receiving single-phase AC power, the receptacle 400 may be adapted to not include the line phase contacts 427, 428, 429 not being used (e.g., the line phase contacts 428, 429). The neutral contact 426 is configured to connect with a neutral contact (e.g., the neutral contact 326, 366 shown in FIGS. 3A and 3B) of an optimized power cord. Each of the line phase contacts 427, 428, 429 is configured to connect with a line phase contact 327, 328, 329 of an optimized power cord.

The DC contact 420 may receive DC power from an optimized power cord. The DC contact 420 includes a positive DC contact 431 and a negative DC contact 432. The positive DC contact 431 is configured to connect with a positive DC contact (e.g., the positive DC contact 331 shown in FIGS. 3A and 3B) of an optimized power cord. The negative DC contact 432 is configured to connect with a negative DC contact (e.g., the negative DC negative contact 332 shown in FIGS. 3A and 3B) of an optimized power cord.

As set forth above with regard to the description of controllers 125, 135, 156, 180, and 195, a controller and electrical supply equipment may include, e.g., a Control Pilot (CP) line and a Proximity Pilot (PP) line. The CP line may be used by, e.g., the controller to indicate, e.g., the power receiving level(s) of, e.g., the vehicle and/or electrically powered accessory, e.g., climate-control unit, to initiate receiving power and/or to communicate other information to electrical supply equipment. The PP line, i.e., Plug Present line, may further be utilized to determine a status of the latch mechanism or a plug in a socket.

Thus, communication contact 425, which facilitates communication with an electrically powered accessory, includes a control pilot contact 433 that provides post-insertion signaling, a proximity pilot contact 434 that provides post-insertion signaling, and a protective earth contact 435 that may provide a full-current protective earthing system. The control pilot contact 433 connects with a control pilot contact (e.g., the control pilot contact 433 shown in FIGS. 3A and 3B) of an optimized power cord. The proximity pilot contact 434 is configured to connect with a proximity pilot contact (e.g., the proximity pilot contact 434 shown in FIGS. 3A and 3B) of an optimized power cord. The protective earth contact 435 is configured to connect with a protective earth contact (e.g., the protective earth contact 435 shown in FIGS. 3A and 3B) of an optimized power cord.

The configuration of the receptacle 400 allows the electrically powered accessory to simultaneously receive AC power from an AC power source and DC power from a DC source from a single plug of an optimized power cord.

While the receptacle 400 is shown to accept a Type 2 combo plug configuration reflecting VDE-AR-E 2623-2-2 plug specifications, it will be appreciated that in other embodiments the receptacle 400 may be modified to accept a Type 3 combo plug configuration reflecting EV Plug Alliance specifications and/or a fast charge coupler plug configuration reflecting, for example, CHAdeMO specifications. Also, in some embodiments, the receptacle 400 may be modified to accept a Type 1 combo configuration reflecting SAE J1772/2009 automotive plug specifications.

The receptacle 400 also includes a latch mechanism 440 that is configured to lock the single plug when connected to the receptacle 400. In some embodiments, the latch mechanism 440 is a motorized device that physically obstructs an unlock tab (e.g., the unlock tab 340 shown in FIGS. 3A and 3B) of the single plug when the single plug is connected to the receptacle 400 as a safety feature to prevent a user from removing the single plug from the receptacle 400 until it is safe to do so. The PP line may further be utilized to determine a status of the latch mechanism or a plug in a socket.

Figure 5:
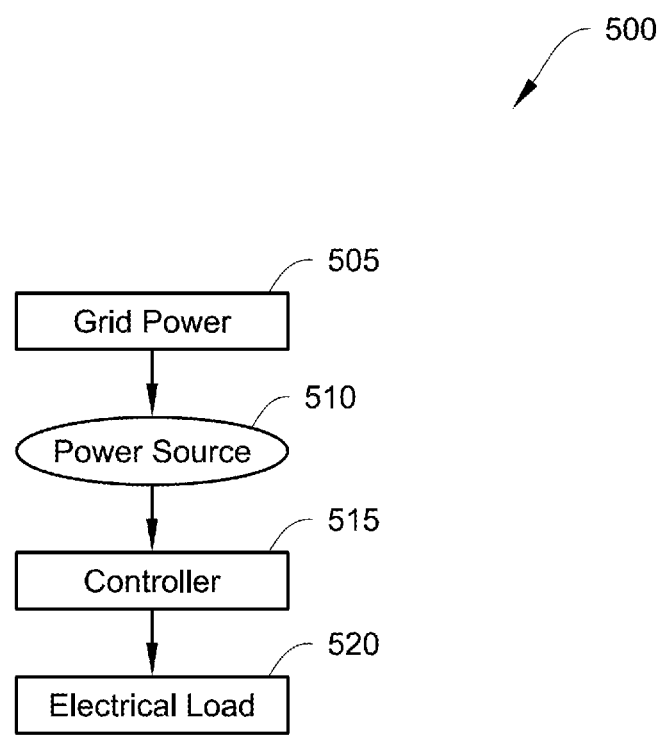
FIG. 5 illustrates a system by which an energy supply to an electrical system associated with an automotive application may be managed by a controller, in accordance with at least one example embodiment described or recited herein.

FIG. 5 illustrates a system 500 by which a power supply to an electrical system associated with an automotive application may be managed by a controller 515, in accordance with at least one example embodiment described or recited herein.

Grid power 505 may refer to a utility power source, as referenced above, as well as a utility infrastructure or local grid. Grid power 505 may further serve to provide communications, e.g., PLC or Ethernet, providing peak and continuous power threshold for electrical accessories in an electrical system.

Power source 510 may refer to electrical supply equipment, e.g., ESE 250, which can include an AC power source and/or a DC power source.

Controller 515 may refer to any of controllers 125, 135, 156, 180, and/or 195, of electrically powered accessory 240, e.g., climate-control unit. Controller 515 may be configured, programmed, or designed to distribute AC power received from grid power 505, via electrical supply equipment 220, and/or DC power from the electrical supply equipment 220 to electrically powered accessory 240, in accordance with the embodiments described herein.

Controller 515 may be electrically connected to power source 510 via optimized power cord 255. The optimized power cord 255 may simultaneously provide both AC power and DC power from power source 510 to the electrical load 520.

Controller 515 may be further configured, programmed, or designed to communicate with power source 510 via, e.g., a CP line, powerline communications (PLC; which may facilitate Ethernet communications over a powerline), etc., which may be utilized to transmit, from power source 510 to controller 515, e.g., the power receiving level(s) of, e.g., the vehicle and/or electrically powered accessory, e.g., climate-control unit, to initiate receiving power and/or to communicate other information to electrical supply equipment. The CP may be used for basic signaling or high level communication (HLC). A basic signal utilizes a 1 kHz PWM signal sent by a charging station to the vehicle over the CP signal. HLC utilizes either power line modulation over the CP or a wireless connection to set up a connection between the ESE and the vehicle using, e.g., digital communication protocol ISO 15118. Both basic signaling and HLC allow the ESE to provide data to controller 125 indicating ESE's maximum current output.

Thus, based on the received control pilot signal, controller 515 may be further configured, programmed, or otherwise designed to calculate a ramp rate based on the received control pilot signal; determine a maximum current available from current source 510; prohibit start-up for one or more components of electrical load 520 when the determined maximum current available is less than the minimum amount of power needed for at least that one component to start up; restrict power or current flow to the electrical load 520 when the determined maximum current available exceeds a minimum amount of power or current for the one or more components of electrical load 520 to start-up but does not provide a maximum steady state current; and remove restrictions for the one or more components of electrical load 520 when the determined maximum current available provides a maximum steady state current.

In accordance with at least some example embodiments, when controller 515 prohibits start-up for one or more components of electrical load 520, controller 515 may issue a warning. The warning may be implemented in various forms, including an error message sent to power source 510 via the CP line.

In accordance with at least some example embodiments, when controller 515 restricts current flow to electrical load 520, controller 515 may adjust a ramp up rate of one or more components of electrical load 520 and limit a maximum current draw for electrical load 520, based on the determined maximum current available.

Further still, in accordance with at least some example embodiments, when controller 515 removes restrictions for electrical load 520, controller 515 may adjust a ramp up rate of one or more components of electrical load 520 to reduce a maximum current draw for electrical load 520, based on the determined maximum current available; and controller 515 may implement or permit operation of the components of electrical load 520 without reduction on a back steady state current draw from power source 520.

Power electronics corresponding to controller 515, e.g., VFD, soft-starter, DC-DC converters, LDO, etc., may ramp AC or DC current to various electrical loads on a transport refrigeration or HVAC units and control the ramp rate based on the CP signal. The power electronics may be disposed between the power supply and the electrical load/accessory. Alternatively, an inrush limiting resistor, e.g., of positive temperature coefficient, may be utilized to limit the current rate of change to be less than the peak threshold from power source. An additional switch may short-cut the resistance when the current rate limitation is no longer needed, as determined by the controller.

Electrical load 520 may refer to electrically powered accessory, e.g., any one of CCU 115, 133, 152, 166, 170 shown in FIGS. 1A-E. Electrical load 520 may include a receptacle to receive an optimized power cord. The receptacle may be included in a power distribution unit of the electrical load 520.

Figure 6:
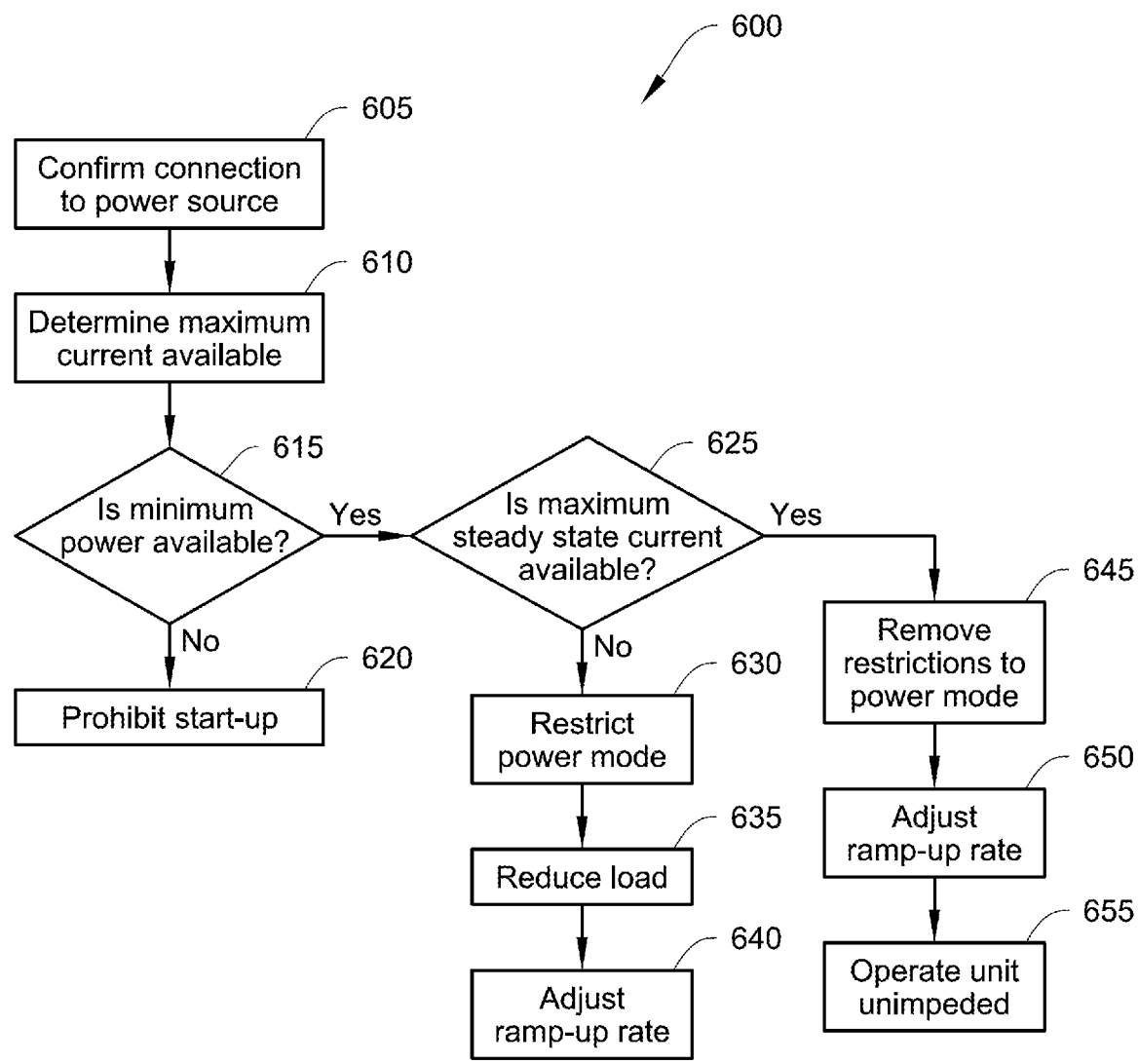
FIG. 6 illustrates a processing flow by which a power supply to an electrical system associated with an automotive application may be managed by a controller, in accordance with at least one example embodiment described or recited herein.

FIG. 6 illustrates a processing flow 600 by which a power supply to an electrical system associated with an automotive application may be managed by a controller, in accordance with at least one example embodiment described or recited herein. As depicted, operational flow 600 includes functions executed by various components of controller 515 shown in FIG. 5, and therefore the controllers of FIGS. 1A-1E. However, operational flow 600 is not limited to such components and processes, as obvious modifications may be made by re-ordering two or more of the sub-processes described here, eliminating at least one of the sub-processes, adding further sub-processes, substituting components, or even having various components assuming sub-processing roles accorded to other components in the following description. Operational flow 600 may include various operations, functions, or actions as illustrated by one or more of blocks 605, 610, 615, 620, 625, 630, 635, 640, 645, 650, and 655. These various operations, functions, or actions may, for example, correspond to software, program code, or program instructions executable by a digital processor that causes the functions to be performed. Operations may begin at block 605.

Block 605 (Confirm Connection to Power Source) may refer to controller 515 confirming at least a communicative connection to electrical supply equipment, e.g., ESE 250. As set forth above, controller 515 may communicate with power source 510 using, e.g., PLC, PWM communications, LIN communications, CAN communications, Pilot signal analog feedback, etc., to support, e.g., CS, ChadeMO, Guobiao recommended-standard 20234, Tesla Supercharger, and/or other electrical supply equipment standards. Communications between controller 515 and power source 510 may include, e.g., a CP line that may be used by controller 515 to indicate the power receiving level(s) of electrical load 520, e.g., the vehicle and/or electrically powered accessory, e.g., climate-control unit, to initiate receiving power and/or to communicate other information to electrical supply equipment.

The CP line may be used for basic signaling that utilizes a 1 kHz PWM signal sent by power source 510 to, e.g., the controller 515 or load 520 over the CP signal; or the CP line may be used for HLC that utilizes either power line modulation over the CP or a wireless connection (Wi-Fi or Zigbee) to communicatively connect power source 510 and, e.g., the controller 515 or load 520 using, e.g., digital communication protocol ISO 15118.

Both basic signaling and HLC allow the power source 510 to provide data to controller 515 indicating the maximum current output from power source 510. Then, a VFD, soft-starter, DC-DC converters, LDO, or other power electronics corresponding to controller 515 may be utilized to ramp AC or DC current to various electrical loads on a transport refrigeration or HVAC units and control the ramp rate based on the CP signal. Thus, the controller 515 may configured, programmed, or otherwise designed to calculate what a ramp rate should be or will receive that information from another controller that receives the control pilot signal. Processing may proceed to block 610.

Block 610 (Determine Max Current Available) may refer to controller 515 determining, based information received on the CP or other communications protocols described herein, e.g., PLC CAN, etc., received from power source 510, the maximum current available from power source 510. The "maximum" current may be relative, based on knowledge of the power supply, e.g., infrastructure and hardware features of the power source. For example, the power source may be in series with a breaker that is rated for a certain current, and therefore the ESE likely has a rated current for which its internal components are rated. Thus, maximum current may be available in peak and continuous variables, with peak variables influencing ramp rate limitations as relate to current rate of change, i.e., inrush. Processing may proceed to decision block 615.

Decision block 615 (Min. Power Available?) may refer to controller 515 determining, based on the maximum current available from power source 510, whether the minimum power required for one or more components of electrical load 520 is available. As set forth above, the CP line may be utilized by controller 515 to indicate power receiving levels of the components of electrical load 520 to initiate receiving power and/or to communicate other information to power source 510. If the determination is "no," processing may proceed to block 620; if the determination is "yes," processing may proceed to decision block 625.

Block 620 (Prohibit Start Up) may refer to controller 515 prohibiting start-up for one or more components of electrical load 520. Controller 515 may prohibit start-up by, e.g., issuing a warning to power source 510 via the CP line and/or display an error message to indicate that there is insufficient power for one or more components of electrical load 520. If minimum power from the ESE is not available, components of electrical load 520 are unable to start based on the power supplied thereto. However, there may be other power sources, e.g., battery, engine, etc., although a battery cannot be charged while it is supply power to electrical load 520 because electrical load 520 is drawing more current from the battery than the electrical source is inputting.

Decision block 625 (Max Steady State Current Available?) may refer to controller 515 determining, based on the control pilot signal from power source 510, whether a maximum steady state current is available from power source 510. Maximum steady state current refers to the maximum expected current draw of electrical load 520. If the determination is "no," processing may proceed to block 630; if the determination is "yes," processing may proceed to decision block 655.

Block 630 (Restrict Power Mode) may refer to controller 515 implementing a power mode restriction on one or more components of electrical load 520. For example, a compressor driver or battery charger may be placed in a power restriction mode, i.e., turning off one or more constant power components, e.g. heaters, telematics, lights; or run at a lower speed or lower level of charging current. Processing may proceed to block 635.

Block 635 (Reduce Load) may refer to controller 515 reducing, or causing a reduction of, load-based power for one or more components of electrical load 520. As a non-limiting example, controller 515 may cause, by action or instruction, a fan speed to be reduced, a compressor speed to be reduced, a battery charging rate reduced, a change in power for an electric heater, constant power components being turned off, etc. Processing may proceed to block 640.

Block 640 (Adjust Ramp Up Rate) may refer to controller 515 adjusting a ramp up rate of one or more components of electrical load 520, based on the determined maximum current available from electrical source 510, and limit a maximum power draw for the one or more components by, e.g., slowly ramping up a compressor, soft starting a motor (e.g., starting in delta winding configuration and switching to a wye winding configuration). Adjustments to ramp may vary depending the device utilized for that purpose, e.g., a VFD may change an increase in output frequency if ramp up of the current draw is to be slowed. Processing may proceed to block 645.

Block 645 (Remove Restrictions to Power Mode) may refer to controller 515 determining that the components of electrical load 520 may be powered-on without restriction. Processing may proceed to block 650.

Block 650 (Adjust Ramp Up Rate) may refer to controller 515, based on the determined maximum current available from power source 510, adjusting a ramp up rate of the components of electrical load 520 to reduce a maximum transient current draw. Processing may proceed to block 655.

Block 655 (Operate Unit Unimpeded) may refer to the components of electrical load 520 operating without any reduction in the steady state power draw.

As described and recited herein, known communication signals from charging equipment may be exploited to serve as a basis for reducing unit current demand. That is, the control signal from a power source or supply equipment informs unit power draw decisions.

ASPECTS

It is to be appreciated that any of the following aspects may be combined:

Aspect 1. A method for managing power supplied to an electrical system associated with an automotive application, the method being performed by a controller that is electrically connected to at least the electrical system, the method comprising:
  connecting the electrical system to an electrical power source;
  determining a maximum power delivery available from the electrical power source;
  modifying system operation for the electrical system when the determined maximum power delivery available is less than a minimum amount of power or current for the electrical system to start-up;
  adjusting power or current to the electrical system when the determined maximum power delivery available exceeds a minimum amount of power or current for the electrical system to start-up but does not provide a maximum steady state power delivery; and
  removing any restrictions for the electrical system when the determined maximum power delivery available provides a maximum steady state power delivery.

Aspect 2. The method of Aspect 1, wherein the connecting includes electrically connecting the controller to the electrical power source.

Aspect 3. The method of Aspect 1 or Aspect 2, wherein the determining includes receiving data indicating the maximum power delivery available in a communication signal from the electrical power source.

Aspect 4. The method of any one of Aspects 1-3, wherein the connecting includes communicatively connecting the controller wirelessly to the electrical power source.

Aspect 5. The method of any one of Aspects 1-4, wherein the modifying includes displaying an error message indicating insufficient power or current for the electrical system.

Aspect 6. The method of any one of Aspects 1-5, wherein adjusting power or current for the electrical system includes reducing a load for the electrical system, based on the determined maximum power delivery available.

Aspect 7. The method of any one of Aspects 1-6, wherein adjusting power or current for the electrical system further includes using power electronics to slowly ramp power to loads to limit the maximum transient power draw for the electrical system, based on the determined maximum power delivery available, during start up.

Aspect 8. The method of any one of Aspects 1-7, wherein removing any restrictions for the electrical system includes using power electronics to slowly ramp power to loads to limit the maximum transient power draw for the electrical system, based on the determined maximum power delivery available.

Aspect 9. The method of any one of Aspects 1-8, wherein removing any restrictions for the electrical system further includes operating the electrical system with no reduction on a back steady state current draw from the electrical power source.

Aspect 10. A computer-readable medium that stores executable instructions that, upon execution, cause a power distribution controller, electrically connected to both a power source and an electrical system, to protect the electrical system by performing functions comprising: receiving information indicating a maximum power delivery available to the electrical system from the electrical power source;
  modifying system operation for the electrical system when the maximum power delivery available to the electrical system from the electrical power source does not exceed a first threshold;
  adjusting power or current from the electrical power source to the electrical system when the maximum power delivery available to the electrical system from the electrical power source exceeds the first threshold but does not exceed a second threshold; and
  permitting unrestricted power or current from the electrical power source to the electrical system when the maximum power delivery available to the electrical system from the electrical power source exceeds both the first threshold and the second threshold.

Aspect 11. The computer-readable medium of Aspect 10, wherein the controller is to receive the information indicating the maximum power delivery available to the electrical system from the electrical power source via a control pilot signal.

Aspect 12. The computer-readable medium of Aspect 10 or Aspect 11, wherein the controller is to receive the information indicating the maximum power delivery available to the electrical system from the electrical power source via a wireless connection.

Aspect 13. The computer-readable medium of any one of Aspects 10-12, wherein the first threshold upon which the controller is to prohibit start-up for the electrical system is a minimum amount of power or current for the electrical system to start-up.

Aspect 14. The computer-readable medium of any one of Aspects 10-13, wherein the second threshold upon which the controller is to restrict power or current from the electrical power source is a maximum steady state power delivery.

Aspect 15. The computer-readable medium of any one of Aspects 10-14, wherein the controller is to restrict power or current from the electrical power source by reducing a load for the electrical system.

Aspect 16. The computer-readable medium of any one of Aspects 10-15, wherein the controller is to restrict power or current from the electrical power source by further adjusting a ramp up rate of loads and limiting a maximum power or current draw for the electrical system.

Aspect 17. The computer-readable medium of any one of Aspects 10-16, wherein the controller is to permit unrestricted power or current from the electrical power source by adjusting a ramp up rate of loads to reduce a maximum power or current draw for the electrical system.

Aspect 18. The computer-readable medium of any one of Aspects 10-17, wherein the controller is to permit unrestricted power or current from the electrical power source by enabling operation of the electrical system with no reduction on a back steady state power or current draw from the electrical power source.

Aspect 19. The computer-readable medium of any one of Aspects 10-18, wherein the computer-readable medium is associated with a power distribution unit for a vehicle that is at least partially electrically powered and a climate control unit that is used in a transport climate-control system providing climate control to at least one of an internal space of the vehicle, an internal space of a trailer, and an internal space of a shipping container.

Aspect 20. A power distribution unit for a vehicle that is at least partially electrically powered and a climate control unit that is used in a transport climate-control system, comprising a controller that includes the computer-readable medium of Aspect 10.

Aspect 21. A power distribution unit for a vehicle that is at least partially electrically powered and a climate control unit that is used in a transport climate-control system, comprising a controller that includes the computer-readable medium of Aspect 10 or Aspect 11.

Aspect 22. A power distribution unit for a vehicle that is at least partially electrically powered and a climate control unit that is used in a transport climate-control system, comprising a controller that includes the computer-readable medium of any one of Aspects 10-12.

Aspect 23. A power distribution unit for a vehicle that is at least partially electrically powered and a climate control unit that is used in a transport climate-control system, comprising a controller that includes the computer-readable medium of any one of Aspects 10-13.

Aspect 24. A power distribution unit for a vehicle that is at least partially electrically powered and a climate control unit that is used in a transport climate-control system, comprising a controller that includes the computer-readable medium of any one of Aspects 10-14.

Aspect 25. A power distribution unit for a vehicle that is at least partially electrically powered and a climate control unit that is used in a transport climate-control system, comprising a controller that includes the computer-readable medium of any one of Aspects 10-15.

Aspect 26. A power distribution unit for a vehicle that is at least partially electrically powered and a climate control unit that is used in a transport climate-control system, comprising a controller that includes the computer-readable medium of any one of Aspects 10-16.

Aspect 27. A power distribution unit for a vehicle that is at least partially electrically powered and a climate control unit that is used in a transport climate-control system, comprising a controller that includes the computer-readable medium of any one of Aspects 10-17.

Aspect 28. A power distribution unit for a vehicle that is at least partially electrically powered and a climate control unit that is used in a transport climate-control system, comprising a controller that includes the computer-readable medium of any one of Aspects 10-18.

Aspect 29. A power distribution unit for a vehicle that is at least partially electrically powered and a climate control unit that is used in a transport climate-control system, comprising a controller that includes the computer-readable medium of any one of Aspects 10-19.

Aspect 30: A method for managing power or current supplied to at least a climate control unit that is used in a transport climate control system providing climate control to at least one of an internal space of a vehicle, the method being performed by a controller that is electrically connected to at least the electrical system, the method comprising:
  communicatively connecting the climate control unit to an electrical power source;
  determining a maximum power delivery available from the electrical power source;
  modifying system operation for the climate control unit when the determined maximum power delivery available is less than a minimum amount of power or current for the climate control unit to start-up;
  adjusting power or current to the electrical system when the determined maximum power delivery available exceeds a minimum amount of power or current for the climate control unit to start-up but does not provide a maximum steady state power delivery; and removing any restrictions for the electrical system when the determined maximum power delivery available provides a maximum steady state power delivery.

Aspect 31. The method of Aspect 30, wherein the connecting includes electrically connecting the controller to the electrical power source.

Aspect 32. The method of either of Aspect 30 or Aspect 31, wherein the determining includes receiving data indicating the maximum power delivery available in a control pilot signal from the electrical power source.

Aspect 33. The method of any one of Aspects 30-32, wherein the communicatively connecting includes communicatively connecting the controller to the electrical power source wirelessly.

Aspect 34. The method of any one of Aspects 30-33, wherein the modifying includes displaying an error message indicating insufficient power or current for the climate control unit.

Aspect 35. The method of any one of Aspects 30-34, wherein adjusting power or current for the climate control unit includes reducing a load for the electrical system, based on the determined maximum power delivery available.

Aspect 36. The method of any one of Aspects 30-35, wherein adjusting power or current for the climate control unit further includes adjusting a ramp up rate of loads and limiting a maximum power or current draw for the climate control unit, based on the determined maximum power delivery available.

Aspect 37. The method of any one of Aspects 30-36, wherein removing any restrictions for the climate control unit includes adjusting a ramp up rate of loads to reduce a maximum power or current draw for the climate control unit, based on the determined maximum power delivery available.

Aspect 38. The method of any one of Aspects 30-37, wherein removing any restrictions for the climate control unit further includes operating the climate control unit with no reduction on a back steady state power or current draw from the electrical power source.

Aspect 39. A computer-readable medium that stores executable instructions that, upon execution, cause a power distribution controller, electrically connected to at least a power source and a climate control unit that is used in a transport climate control system providing climate control to at least one of an internal space of a vehicle, to protect the electrical system by performing functions comprising:
receiving information indicating a maximum power delivery available to the climate control unit from the electrical power source;
modifying system operation for the climate control unit when the maximum power delivery available to the climate control unit from the electrical power source does not exceed a first threshold;
adjusting power or current from the electrical power source to the climate control unit when the maximum power delivery available to the climate control unit from the electrical power source exceeds the first threshold but does not exceed a second threshold; and
permitting unrestricted power or current from the electrical power source to the climate control unit when the maximum power delivery available to the climate control unit from the electrical power source exceeds both the first threshold and the second threshold.

Aspect 40. The computer-readable medium of Aspect 39, wherein the controller is to receive the information indicating the maximum power delivery available to the climate control unit from the electrical power source via a control pilot signal.

Aspect 41. The computer-readable medium of any one of Aspects 39-40, wherein the controller is to receive the information indicating the maximum power delivery available to the climate control unit from the electrical power source via a wireless connection.

Aspect 42. The computer-readable medium of any one of Aspects 39-41, wherein the first threshold upon which the controller is to prohibit start-up for the climate control unit is a minimum amount of power or current for the climate control unit to start-up.

Aspect 43. The computer-readable medium of any one of Aspects 39-42, wherein the second threshold upon which the controller is to restrict power or current from the electrical power source is a maximum steady state power delivery.

Aspect 44. The computer-readable medium of any one of Aspects 39-43, wherein the controller is to restrict power or current from the electrical power source by reducing a load for the climate control unit.

Aspect 45. The computer-readable medium of any one of Aspects 39-44, wherein the controller is to restrict power or current from the electrical power source by further adjusting a ramp up rate of loads and limiting a maximum power or current draw for the climate control unit.

Aspect 46. The computer-readable medium of any one of Aspects 39-45, wherein the controller is to permit unrestricted power or current from the electrical power source by adjusting a ramp up rate of loads to reduce a maximum power or current draw for the climate control unit.

Aspect 47. The computer-readable medium of any one of Aspects 39-46, wherein the controller is to permit unrestricted power or current from the electrical power source by enabling operation of the climate control unit with no reduction on a back steady state power or current draw from the electrical power source.

Aspect 48. The computer-readable medium of any one of Aspects 39-47, wherein the computer-readable medium is associated with a power distribution unit for a vehicle that is at least partially electrically powered and a climate control unit that is used in a transport climate-control system providing climate control to at least one of an internal space of the vehicle, an internal space of a trailer, and an internal space of a shipping container.

Aspect 49. A power distribution unit for a vehicle that is at least partially electrically powered and a climate control unit that is used in a transport climate-control system, comprising a controller that includes the computer-readable medium of any one of Aspects 39-49.

Aspect 50. A method for managing power supplied to a transport climate control system providing climate control to at least one of an internal space of a vehicle, the method being performed by a controller that is electrically connected to at least the electrical system, the method comprising:
communicatively connecting the transport climate control system to an electrical power source;
determining a maximum power delivery available from the electrical power source;
modifying system operation for the transport climate control system when the maximum power available is less than a minimum amount of power for the transport climate control system to start-up;
adjusting power to the transport climate control system when the determined maximum power delivery available exceeds a minimum amount of power for the transport climate control system to start-up; and removing any restrictions for the transport climate control system when the determined maximum power delivery available provides a maximum steady state power delivery.

Aspect 51. The method of Aspect 50, wherein the connecting includes electrically connecting the controller to the electrical power source.

Aspect 52. The method of Aspect 50 or 51, wherein the determining includes receiving data indicating the maximum power delivery available via communication with the electrical power source.

Aspect 53. The method of any one of Aspects 50-52, wherein the communicatively connecting includes communicatively connecting the controller to the electrical power source wirelessly.

Aspect 54. The method of any one of Aspects 50-53, wherein the modifying includes displaying an error message indicating insufficient power for the transport climate control system.

Aspect 55. The method of any one of Aspects 50-54, wherein adjusting power for the transport climate control system includes reducing a load for the transport climate control system, based on the determined maximum power delivery available.

Aspect 56. The method of any one of Aspects 50-55, wherein adjusting power for the transport climate control system further includes using power electronics to slowly ramp power to loads to limit an expected maximum transient power draw for the transport climate control system, based on the determined maximum power delivery available.

Aspect 57. The method of any one of Aspects 50-56, wherein removing any restrictions for the transport climate control system includes using power electronics to slowly ramp power to loads to limit an expected maximum transient power draw for the transport climate control system, based on the determined maximum power delivery available.

Aspect 58. The method of any one of Aspects 50-57, wherein removing any restrictions for the transport climate control system further includes operating the transport climate control system with no reduction on a back steady state power draw from the electrical power source.

Aspect 59. A computer-readable medium that stores executable instructions that, upon execution, cause a power distribution controller, electrically connected to at least a power source and a transport climate control system providing climate control to at least one of an internal space of a vehicle, to protect the transport climate control system by performing functions comprising:
  receiving information indicating a maximum power delivery available to the transport climate control system from the electrical power source;
  modifying system operation for the transport climate control system when the maximum power delivery available to the transport climate control system from the electrical power source does not exceed a first threshold;
  adjusting power from the electrical power source to the transport climate control system when the maximum power delivery available to the transport climate control system from the electrical power source exceeds the first threshold but does not exceed a second threshold; and
  permitting unrestricted power from the electrical power source to the transport climate control system when the maximum power delivery available to the transport climate control system from the electrical power source exceeds both the first threshold and the second threshold.

Aspect 60. The computer-readable medium of Aspect 59, wherein the controller is to receive the information indicating the maximum power delivery available to the transport climate control system from the electrical power source via communication with the electrical power source.

Aspect 61. The computer-readable medium of Aspect 59 or Aspect 60, wherein the controller is to receive the information indicating the maximum power delivery available to the transport climate control system from the electrical power source via a wireless connection.

Aspect 62. The computer-readable medium of any one of Aspects 59-61, wherein the first threshold upon which the controller is to prohibit start-up for the transport climate control system is a minimum amount of power for the transport climate control system to start-up.

Aspect 63. The computer-readable medium of any one of Aspects 59-62, wherein the second threshold upon which the controller is to restrict power from the electrical power source is a maximum steady state power delivery.

Aspect 64. The computer-readable medium of any one of Aspects 59-63, wherein the controller is to restrict power from the electrical power source by reducing a load for the transport climate control system.

Aspect 65. The computer-readable medium of any one of Aspects 59-64, wherein the controller is to restrict power from the electrical power source by further adjusting a ramp up rate of loads and limiting a maximum power draw for the transport climate control system.

Aspect 66. The computer-readable medium of any one of Aspects 59-65, wherein the controller is to permit unrestricted power from the electrical power source by adjusting a ramp up rate of loads to reduce a maximum power draw for the transport climate control system.

Aspect 67. The computer-readable medium of any one of Aspects 59-66, wherein the controller is to permit unrestricted power from the electrical power source by enabling operation of the transport climate control system with no reduction on a back steady state power draw from the electrical power source.

Aspect 68. The computer-readable medium of any one of Aspects 59-67, wherein the computer-readable medium is associated with a power distribution unit for a vehicle that is at least partially electrically powered and a transport climate-control system providing climate control to at least one of an internal space of the vehicle, an internal space of a trailer, and an internal space of a shipping container.

Aspect 69. A power distribution unit for a vehicle that is at least partially electrically powered and a transport climate-control system, comprising a controller that includes the computer-readable medium of any one of Aspects 59-68.

Aspect 70. A method for managing power supplied to a transport climate control system providing climate control to at least one of an internal space of a vehicle, the method being performed by a controller that is electrically connected to at least the electrical system, the method comprising:
  communicatively connecting the transport climate control system to an electrical power source;
  determining a maximum power delivery available from the electrical power source;
  modifying system operation for the transport climate control system when the maximum power available is less than a minimum amount of power for the transport climate control system to start-up; and removing any restrictions for the transport climate control system when the determined maximum power delivery available provides a maximum steady state power delivery.

Aspect 71. The method of Aspect 70, wherein the connecting includes electrically connecting the controller to the electrical power source.

Aspect 72. The method of Aspect 70 or 71, wherein the determining includes receiving data indicating the maximum power delivery available via communication with the electrical power source.

Aspect 73. The method of any one of Aspects 70-72, wherein the communicatively connecting includes communicatively connecting the controller to the electrical power source wirelessly.

Aspect 74. The method of any one of Aspects 70-73, wherein the modifying includes displaying an error message indicating insufficient power for the transport climate control system.

Aspect 75. The method of any one of Aspects 70-74, further comprising adjusting power for the transport climate control system by reducing a load for the transport climate control system, based on the determined maximum power delivery available.

Aspect 76. The method of any one of Aspects 70-75, wherein the adjusting power for the transport climate control system further includes using power electronics to slowly ramp power to loads to limit an expected maximum transient power draw for the transport climate control system, based on the determined maximum power delivery available.

Aspect 77. The method of any one of Aspects 70-76, wherein removing any restrictions for the transport climate control system includes using power electronics to slowly ramp power to loads to limit an expected maximum transient power draw for the transport climate control system, based on the determined maximum power delivery available.

Aspect 78. The method of any one of Aspects 70-77, wherein removing any restrictions for the transport climate control system further includes operating the transport climate control system with no reduction on a back steady state power draw from the electrical power source.

Aspect 79. A computer-readable medium that stores executable instructions that, upon execution, cause a power distribution controller, electrically connected to at least a power source and a transport climate control system providing climate control to at least one of an internal space of a vehicle, to protect the transport climate control system by performing functions comprising:
receiving information indicating a maximum power delivery available to the transport climate control system from the electrical power source;
modifying system operation for the transport climate control system when the maximum power delivery available to the transport climate control system from the electrical power source does not exceed a first threshold; and
permitting unrestricted power from the electrical power source to the transport climate control system when the maximum power delivery available to the transport climate control system from the electrical power source exceeds both the first threshold and the second threshold.

Aspect 80. The computer-readable medium of Aspect 79, wherein the controller is to receive the information indicating the maximum power delivery available to the transport climate control system from the electrical power source via communication with the electrical power source.

Aspect 81. The computer-readable medium of Aspect 79 or Aspect 80, wherein the controller is to receive the information indicating the maximum power delivery available to the transport climate control system from the electrical power source via a wireless connection.

Aspect 82. The computer-readable medium of any one of Aspects 79-81, wherein the first threshold upon which the controller is to prohibit start-up for the transport climate control system is a minimum amount of power for the transport climate control system to start-up.

Aspect 83. The computer-readable medium of any one of Aspects 79-82, wherein the second threshold upon which the controller is to restrict power from the electrical power source is a maximum steady state power delivery.

Aspect 84. The computer-readable medium of any one of Aspects 79-83, wherein the controller is to restrict power from the electrical power source by reducing a load for the transport climate control system.

Aspect 85. The computer-readable medium of any one of Aspects 79-84, wherein the controller is to restrict power from the electrical power source by further adjusting a ramp up rate of loads and limiting a maximum power draw for the transport climate control system.

Aspect 86. The computer-readable medium of any one of Aspects 79-85, wherein the controller is to permit unrestricted power from the electrical power source by adjusting a ramp up rate of loads to reduce a maximum power draw for the transport climate control system.

Aspect 87. The computer-readable medium of any one of Aspects 79-86, wherein the controller is to permit unrestricted power from the electrical power source by enabling operation of the transport climate control system with no reduction on a back steady state power draw from the electrical power source.

Aspect 88. The computer-readable medium of any one of Aspects 79-87, wherein the computer-readable medium is associated with a power distribution unit for a vehicle that is at least partially electrically powered and a transport climate-control system providing climate control to at least one of an internal space of the vehicle, an internal space of a trailer, and an internal space of a shipping container.

Aspect 89. A power distribution unit for a vehicle that is at least partially electrically powered and a transport climate-control system, comprising a controller that includes the computer-readable medium of any one of Aspects 79-88.

The terminology used in this specification is intended to describe particular embodiments and is not intended to be limiting. The terms "a," "an," and "the," or even the absence of such modifiers, may refer to the plural forms as well, unless clearly indicated otherwise. The terms "includes," "including," "comprises" and/or "comprising," when used in this specification, indicate the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts, without departing from the scope of the present disclosure. The word "embodiment" as used within this specification may, but does not necessarily, refer to the same embodiment. This specification and the embodiments described are examples only. Other and further embodiments may be devised without departing from the basic scope thereof, with the true scope and spirit of the disclosure being indicated by the claims that follow.

The invention claimed is:

1. A method for managing power supplied to a transport climate control system providing climate control to at least one of an internal space of a vehicle, the method being performed by a controller that is electrically connected to at least an electrical system corresponding to the vehicle, the method comprising:
communicatively connecting the transport climate control system to an electrical power source;
determining a maximum power delivery available from the electrical power source;
adjusting power transmission to the transport climate control system by reducing power to an electrical load of the transport climate control system to modify operation for the transport climate control system when the maximum power available is less than a minimum amount of power for the transport climate control system to start-up; and
removing any restrictions for power transmission to the transport climate control system when the determined maximum power delivery available provides a maximum steady state power delivery.

2. The method of claim 1, wherein the communicatively connecting includes electrically connecting the controller to the electrical power source.

3. The method of claim 1, wherein the determining includes receiving data indicating the maximum power delivery available via communication with the electrical power source.

4. The method of claim 1, wherein the communicatively connecting includes communicatively connecting the controller to the electrical power source wirelessly.

5. The method of claim 1, wherein the adjusting power transmission to the transport climate control system includes displaying an error message indicating insufficient power for the transport climate control system.

6. The method of claim 1, further comprising adjusting power for the transport climate control system by reducing power to the electrical load of the transport climate control system, based on the determined maximum power delivery available.

7. The method of claim 6, wherein the adjusting power for the transport climate control system further includes using power electronics to slowly ramp power to the electrical load to limit an expected maximum transient power draw for the transport climate control system, based on the determined maximum power delivery available, during start up.

8. The method of claim 1, wherein the removing any restrictions for the transport climate control system includes using power electronics to slowly ramp power to the electrical load to limit an expected maximum transient power draw for the transport climate control system, based on the determined maximum power delivery available.

9. The method of claim 8, wherein the removing any restrictions for the transport climate control system further includes operating the transport climate control system with no reduction on a back steady state power draw from the electrical power source.

10. A computer-readable medium that stores executable instructions that, upon execution, cause a power distribution controller, electrically connected to at least a power source and a transport climate control system providing climate control to at least one of an internal space of a vehicle, to protect the transport climate control system by performing functions comprising:
receiving information indicating a maximum power delivery available to the transport climate control system from the electrical power source;
adjusting power transmission to the transport climate control system by reducing power to the electrical load of the transport climate control system to modify operation for the transport climate control system when the maximum power delivery available to the transport climate control system from the electrical power source does not exceed a first threshold; and
permitting unrestricted power from the electrical power source to the transport climate control system when the maximum power delivery available to the transport climate control system from the electrical power source exceeds both the first threshold and the second threshold.

11. The computer-readable medium of claim 10, wherein the controller is to receive the information indicating the maximum power delivery available to the transport climate control system from the electrical power source via communication with the electrical power source.

12. The computer-readable medium of claim 10, wherein the controller is to receive the information indicating the maximum power delivery available to the transport climate control system from the electrical power source via a wireless connection.

13. The computer-readable medium of claim 10, wherein the first threshold upon which the controller is to prohibit start-up for the transport climate control system is a minimum amount of power for the transport climate control system to start-up.

14. The computer-readable medium of claim 10, wherein the second threshold upon which the controller is to restrict power from the electrical power source is a maximum steady state power delivery.

15. The computer-readable medium of claim 10, wherein the controller is to restrict power from the electrical power source by reducing power to the electrical load of the transport climate control system.

16. The computer-readable medium of claim 10, wherein the controller is to restrict power from the electrical power source by further adjusting a ramp up rate of power to the electrical load and limiting a maximum power draw for the transport climate control system.

17. The computer-readable medium of claim 10, wherein the controller is to permit unrestricted power from the electrical power source by adjusting a ramp up rate of power to the electrical load to reduce a maximum power draw for the transport climate control system.

18. The computer-readable medium of claim 10, wherein the controller is to permit unrestricted power from the electrical power source by enabling operation of the transport climate control system with no reduction on a back steady state power draw from the electrical power source.

19. The computer-readable medium of claim 10, wherein the computer-readable medium is associated with a power distribution unit for a vehicle that is at least partially electrically powered and a transport climate-control system providing climate control to at least one of an internal space of the vehicle, an internal space of a trailer, and an internal space of a shipping container.

20. A power distribution unit for a vehicle that is at least partially electrically powered and a transport climate-control system, comprising a controller that includes the computer-readable medium of claim 10.

\* \* \* \* \*